US008579525B2

(12) United States Patent
Chapman et al.

(10) Patent No.: US 8,579,525 B2

(45) Date of Patent: Nov. 12, 2013

(54) HYDRAULIC STOP VALVE FOR A CAMERA CRANE

(75) Inventors: Leonard T. Chapman, North Hollywood, CA (US); Robert Stawinski, Sherman Oaks, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 95 days.

(21) Appl. No.: 13/278,051

(22) Filed: Oct. 20, 2011

(65) Prior Publication Data

US 2012/0070143 A1 Mar. 22, 2012

Related U.S. Application Data

(63) Continuation-in-part of application No. 12/537,200, filed on Aug. 6, 2009, now Pat. No. 8,403,486.

(51) Int. Cl.
*G03B 17/00* (2006.01)

(52) U.S. Cl.
USPC .......................................................... 396/428

(58) Field of Classification Search
USPC .......................................................... 396/428
See application file for complete search history.

(56) References Cited

U.S. PATENT DOCUMENTS

| | | | | |
|---|---|---|---|---|
| 4,109,678 | A | 8/1978 | Chapman | |
| 4,219,121 | A | 8/1980 | McPeak | |
| 4,427,121 | A * | 1/1984 | Clements | 212/231 |
| 4,590,958 | A | 5/1986 | Brunner | |
| 4,747,424 | A | 5/1988 | Chapman | |
| 4,899,097 | A | 2/1990 | Chapman | |
| 4,952,953 | A | 8/1990 | Ridderstolpe et al. | |
| 5,058,484 | A * | 10/1991 | Kuttruf | 91/461 |
| 5,516,070 | A | 5/1996 | Chapman | |
| 5,697,757 | A | 12/1997 | Lindsay | |
| 5,819,634 | A | 10/1998 | Chapman | |
| 6,073,913 | A | 6/2000 | Chapman | |
| 6,247,498 | B1 | 6/2001 | Chapman | |
| 6,536,325 | B2 | 3/2003 | Badia Ba | |
| 6,578,819 | B2 | 6/2003 | Chapman | |

(Continued)

FOREIGN PATENT DOCUMENTS

| | | | |
|---|---|---|---|
| EP | 1298087 | A1 | 4/2003 |
| GB | 2207109 | A | 1/1989 |
| WO | 8910894 | A | 11/1989 |
| WO | 9412424 | A | 6/1994 |

OTHER PUBLICATIONS

United States Patent and Trademark Office, International Search Report and Written Opinion for PCT/US2010/044792, mailed Sep. 23, 2010.

(Continued)

*Primary Examiner* — Rodney Fuller

(74) *Attorney, Agent, or Firm* — Kenneth H. Ohriner; Perkins Coie LLP

(57) ABSTRACT

A stop valve for a camera support such as a telescoping camera crane may include a valve pin engagable onto a valve seat, with a pin plate attached to the valve pin. A spring urges the valve pin in a first direction, which may be an opening direction or a closing direction. First and second dampener pins in first and second cylinders are attached to the pin plate. A closed loop fluid filled flow path connects the first and second cylinders. First and second check valves may be used to control flow in the flow path.

17 Claims, 17 Drawing Sheets

(56) References Cited

U.S. PATENT DOCUMENTS

| | | | | |
|---|---|---|---|---|
| 7,121,745 | B2 | 10/2006 | Chapman | |
| 7,128,479 | B2 | 10/2006 | Chapman | |
| 7,252,441 | B2 | 8/2007 | Chapman | |
| 7,311,452 | B2 | 12/2007 | Chapman | |
| 8,033,742 | B1 | 10/2011 | Chapman | |
| 2002/0005112 | A1 | 1/2002 | Badia Ba | |
| 2002/0043283 | A1 * | 4/2002 | Bouwkamp | 137/251.1 |
| 2003/0076480 | A1 | 4/2003 | Burbulla | |
| 2003/0172598 | A1 | 9/2003 | Greer | |
| 2004/0168997 | A1 | 9/2004 | Irsch et al. | |
| 2005/0191049 | A1 | 9/2005 | Chapman | |
| 2007/0230947 | A1 | 10/2007 | Chapman | |
| 2008/0002967 | A1 | 1/2008 | Chapman | |
| 2009/0114482 | A1 * | 5/2009 | von Holzen | 187/253 |
| 2012/0051733 | A1 | 3/2012 | Chapman | |

OTHER PUBLICATIONS

EPC Communication pursuant to Article 94(3) EPC issued in application No. 05 724 101.0-2209 on Feb. 15, 2010.

United States Patent and Trademark Office, International Search Report and Written Opinion for PCT Patent Publication No. WO05/085948, mailed Aug. 11, 2005.

* cited by examiner

FIG. 11
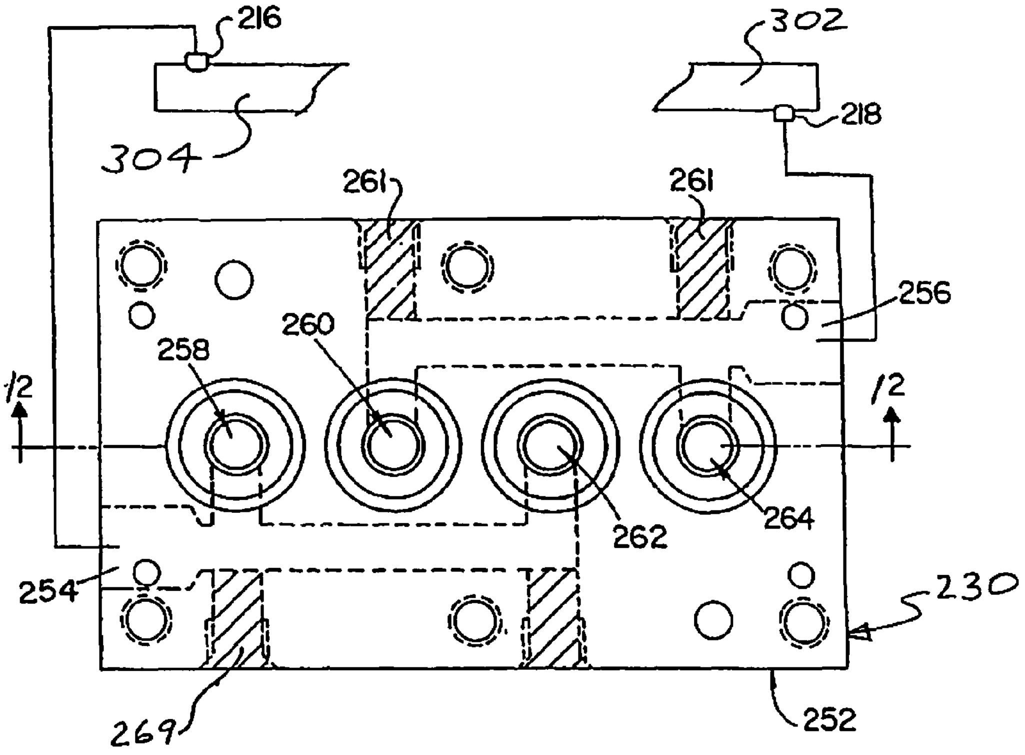
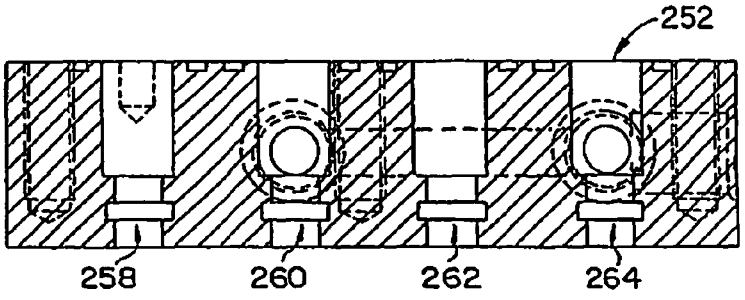
FIG. 12

HYDRAULIC STOP VALVE FOR A CAMERA CRANE

This Application is a Continuation-In-Part of U.S. patent application Ser. No. 12/537,200 filed on Aug. 6, 2009, now U.S. Pat. No. 8,403,486, incorporated herein by reference.

FIELD OF THE INVENTION

Background of the Invention

Camera cranes are often used in motion picture and television production. A motion picture or television camera is typically mounted on a crane arm, which is supported on a mobile base, dolly, or truck. The mobile base may be pushed and steered by hand. Larger units, which have more weight-carrying capacity, and longer reaches, typically have electric driving motors powered by onboard batteries. Some mobile bases also include conventional gasoline or diesel engines, and may serve as over-the-road vehicles.

Telescoping camera cranes have a telescoping arm that can extend and retract. This allows for a broader range of camera movement. These types of cranes generally use a system of cables and pulleys driven by hydraulic actuators to extend and retract telescoping crane sections. The hydraulic actuators are in a hydraulic system including a stop valve. If the stop valve is opened or closed too quickly, the hydraulic actuators may tend to jolt the crane sections. This momentarily stretches the cables, which can cause the telescoping arm to resonate and create undesirable camera movements. It can also result in high stresses on components of the telescoping arm. Accordingly, an improved stop valve which can uniformly avoid jolting the telescoping arm is needed.

SUMMARY OF THE INVENTION

A stop valve for a camera support such as a telescoping camera crane may include a valve pin engagable onto a valve seat, with a pin plate attached to the valve pin. A spring urges the valve pin in a first direction, which may be an opening direction or a closing direction. First and second dampener pins in first and second cylinders are attached to the pin plate. A closed loop fluid filled flow path connects the first and second cylinders. First and second check valves may be used to control flow in the flow path.

The stop valve may be used in a hydraulically actuated camera crane having at least one hydraulic actuator connected directly or indirectly to a telescoping arm, for extending and retracting the arm. A control valve is connected via a hydraulic line to the hydraulic actuator. The stop valve may be electrically linked to a stop switch. When the stop switch is closed, the stop valve closes with a smooth dampened movement. Excessive jolting of the camera and the crane, and inadvertent creation of noise, is avoided. The stop valve may be hydraulically and electrically to the control valve.

Other features and advantages will become apparent from the following detailed description which includes a single embodiment. However, the detailed description is provided by way of an example of how the invention may be made and used. The following detailed description is not intended to be a limitation of the invention. The invention resides as well in sub-combinations of the elements described.

BRIEF DESCRIPTION OF THE DRAWINGS

In the drawings, wherein the same reference number indicates the same element in each of the views:

FIG. 8A shows the system with the crane arm extended and FIG. 8B shows the system with the crane arm retracted.

FIG. 11 is a section view taken along line 11-11 of FIG. 9A.

FIG. 12 is a section view taken along line 12-12 of FIG. 11.

DETAILED DESCRIPTION OF THE DRAWINGS

Figure 1:
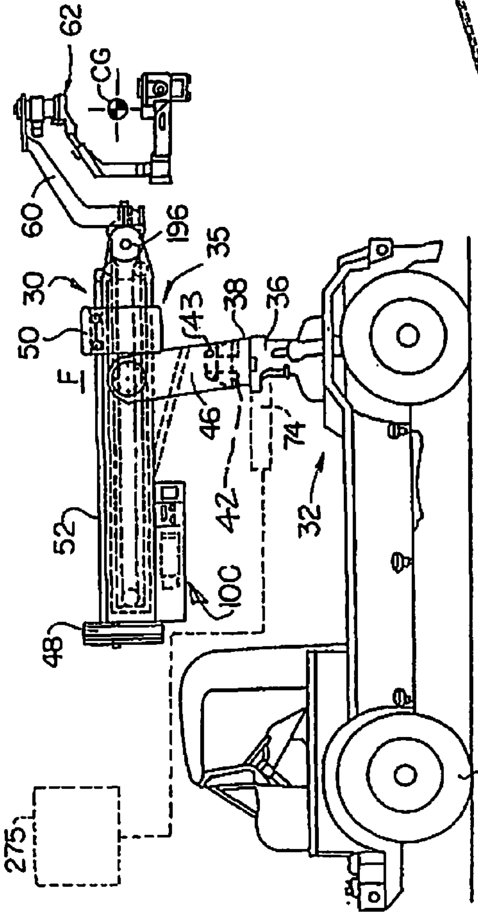
FIG. 1 is a side view of a novel telescoping crane, mounted on a mobile base or vehicle, with the crane in the retracted position. The crane shown has two moving arm sections.
Figure 2:
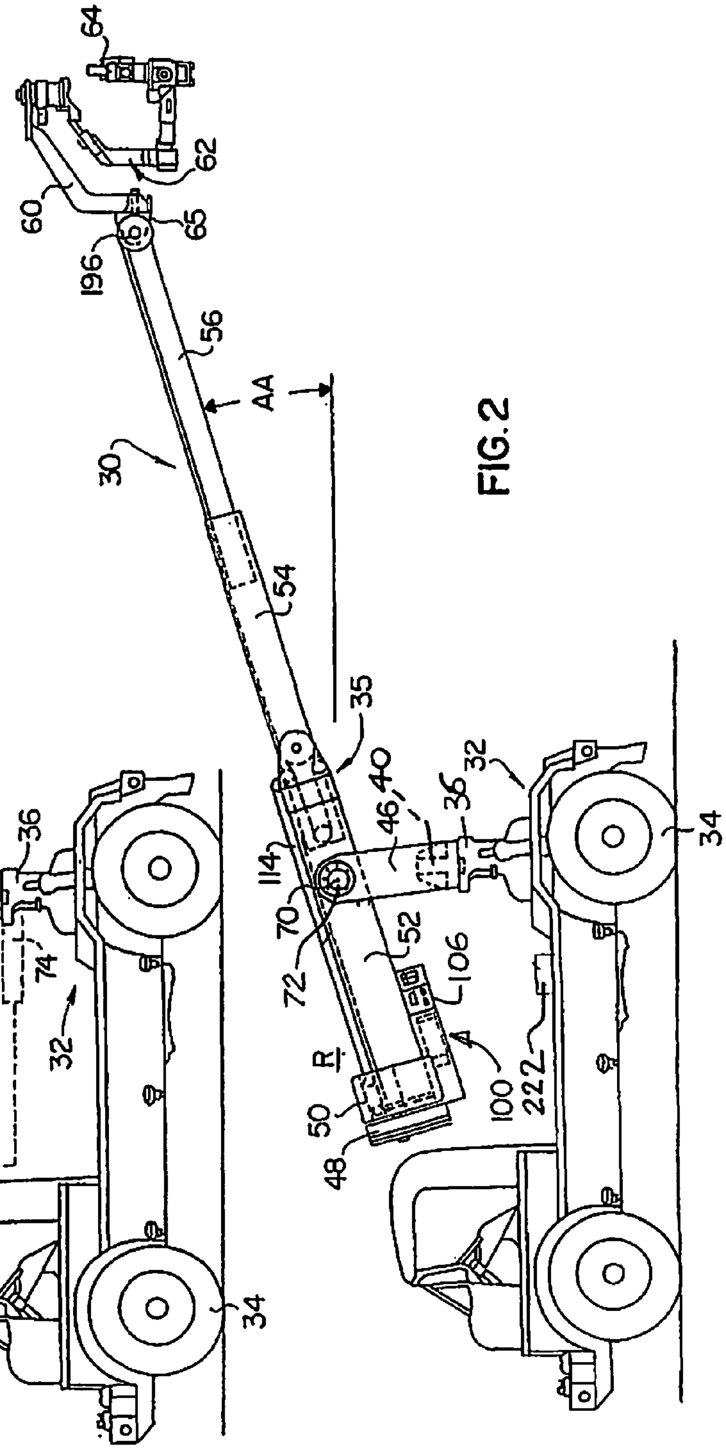
FIG. 2 is a side view of the crane shown in FIG. 1, with the arm now fully extended.

Turning now in detail to the drawings, as shown in FIGS. 1 and 2, a telescoping crane 30 is mounted onto a mobile base 32. The mobile base 32 may be a truck or road vehicle or a motorized special purpose camera crane base or dolly. Typically, the mobile base 32 will have wheels 34 which drive and steer the mobile base. Four-wheel drive and four-wheel steering may be provided. For smaller scale cranes 30, e.g., up to about 5 meters (15 feet), the mobile base 32 may be unmotorized, and may be moved or pushed by hand. For larger versions of the telescoping crane 30, or when required due to ground conditions or other use requirements, the mobile base 32 can have electric motors, or internal combustion engines, for driving the wheels 34.

Figure 3:
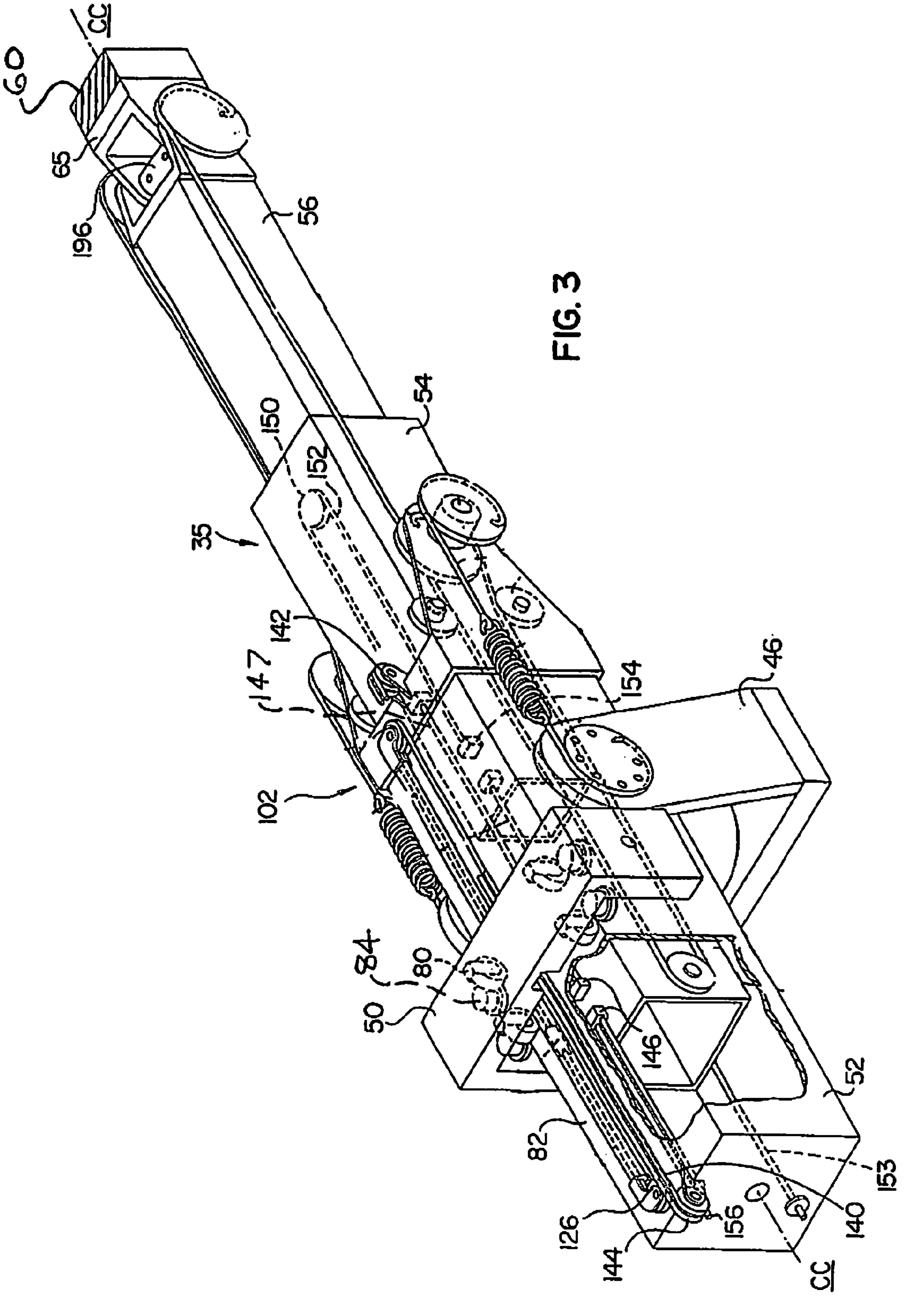
FIG. 3 is a schematic perspective view showing selected components of the crane arm shown in FIGS. 1 and 2.

As shown in FIGS. 1 and 2, the crane 30 is mounted on a column 36 on the mobile base 32. The column 36 may be automatically leveled, as described below, or in any other suitable manner, to maintain the crane 30 in a level orientation as the mobile base 32 moves over uneven ground. A U-shaped center post 46 is rotatably mounted on the column 36. As shown in FIGS. 1-3, a post 40 on the column 36 extends up through a lower column bearing 42 and an upper column bearing 43 secured within a post ring 45 of the center post 46.

Figure 5:
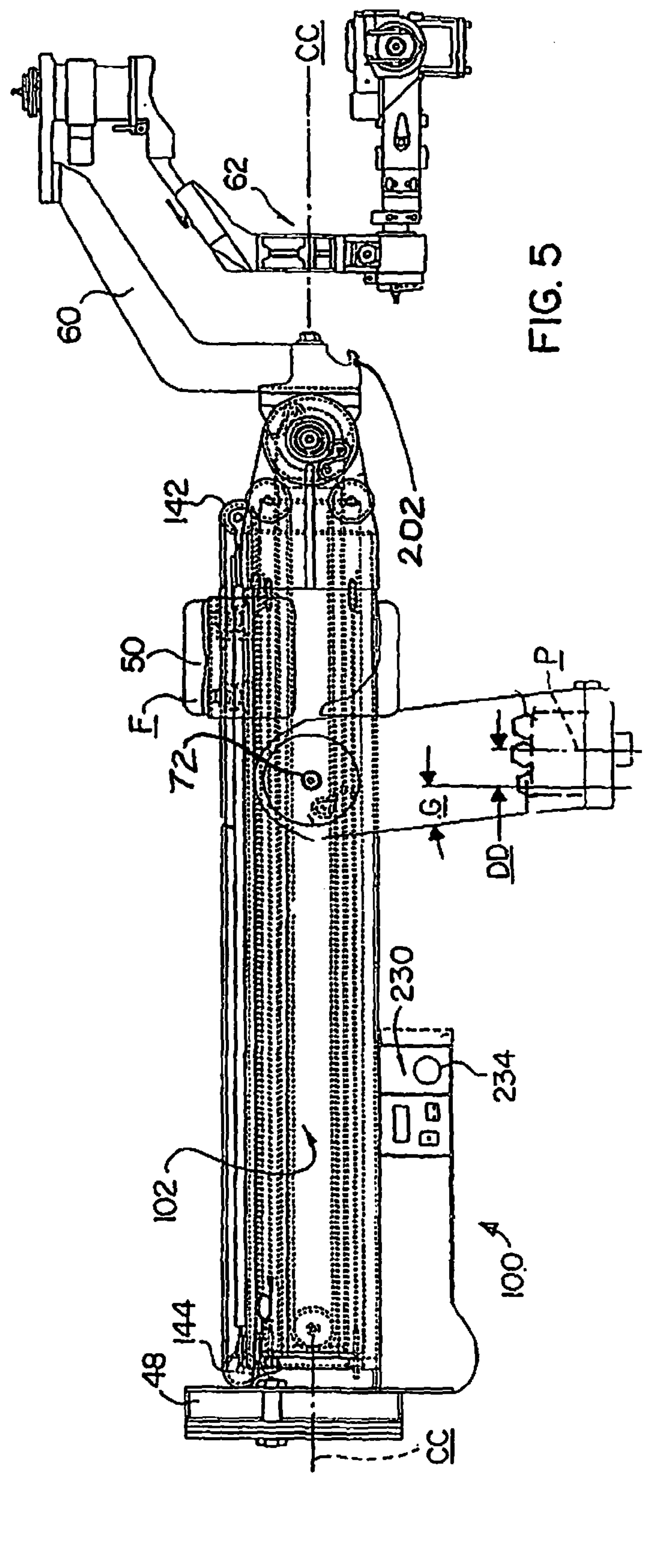
FIG. 5 is side view of the crane arm shown in FIG. 1.
Figure 6:
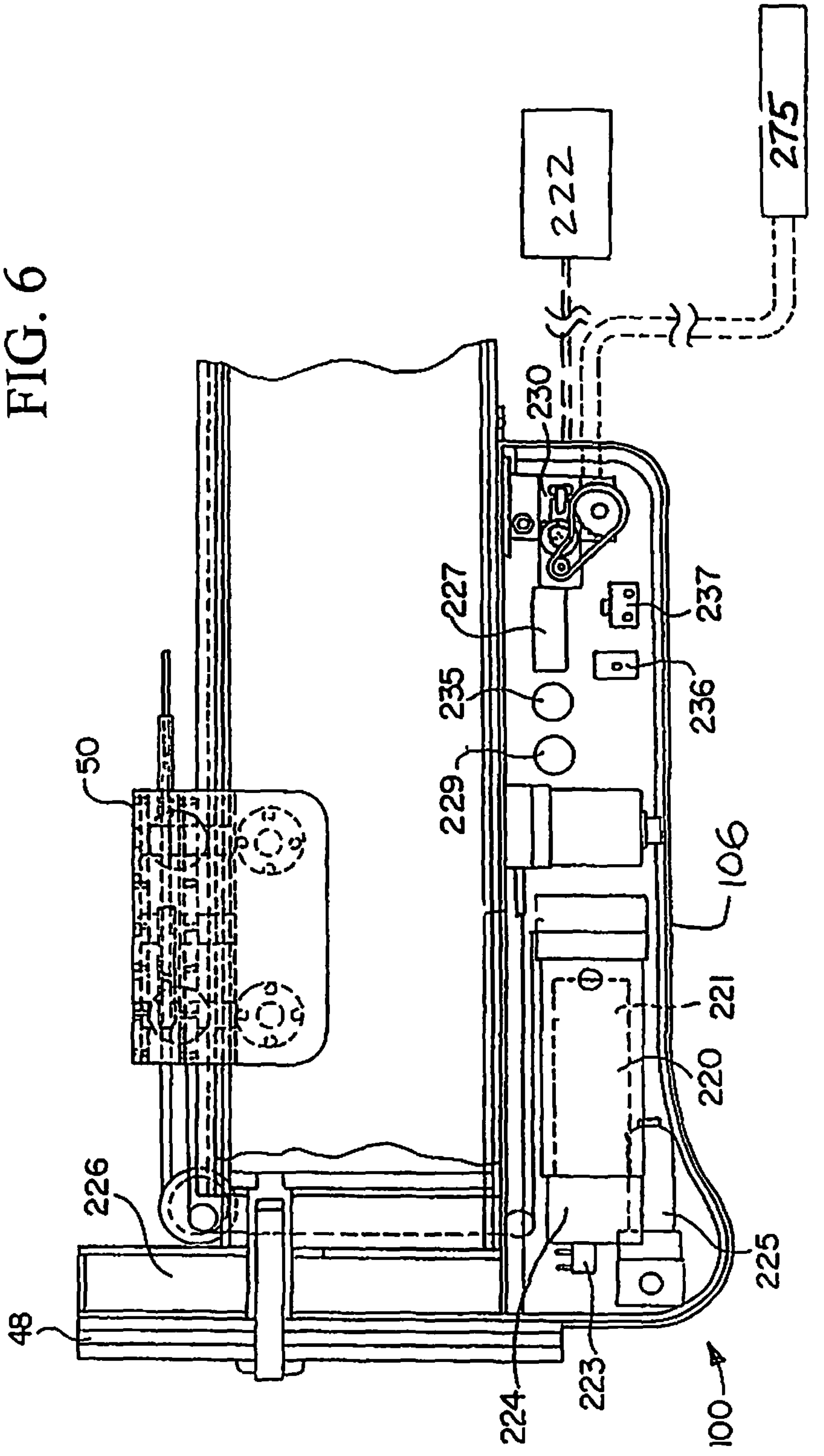
FIG. 6 is a schematic side view of the back end of the crane arm shown in FIG. 1.

As shown in FIG. 5, cap bolts 44 securely attach the center post 46 onto the column 36 of the mobile base 32, while still allowing the center post 46 of the crane 30 to rotate. Also as shown in FIG. 5, the center post 46 extends up at a rearward angle G, so that the tilt axle 70 is offset behind the pan axis P by a distance DD. This offset, which helps to keep the center of gravity of the arm 35 centered over the pan axis bearings 42 and 43, varies with the arm design, and typically is 2-8 cm (1-3 inches). The corresponding angle G is generally 5-15 degrees. An optional potentiometer or angular position sensor 75 has a base attached to the fixed or non-rotating column post 40, and a body linked to and rotatable with the center post 46, to provide an electrical output signal to a controller, such as a control box 275, as shown in FIG. 1.

Referring back to FIGS. 1-3, a crane arm 35 is supported on a tilt axle 70 which is pivotally supported on the center post 46. Consequently, the crane arm 35 can rotate about a pan or azimuth axis, and can also pivot about an elevation or tilt axis.

Referring to FIGS. 1-5, the crane arm 35 includes a first or outer section 52, a second or middle section 54, and a third or inner section 56. The first section 52 is supported on the tilt axle 70 via an axle bearing 72. Fixed or non-moving trim weights 48 are placed at the back end of the first section 52. The trim weights 48 may or may not be needed or used, depending on whether non-moving weight from e.g., accessories, is added to the arm in front of the tilt axle.

Figure 4:
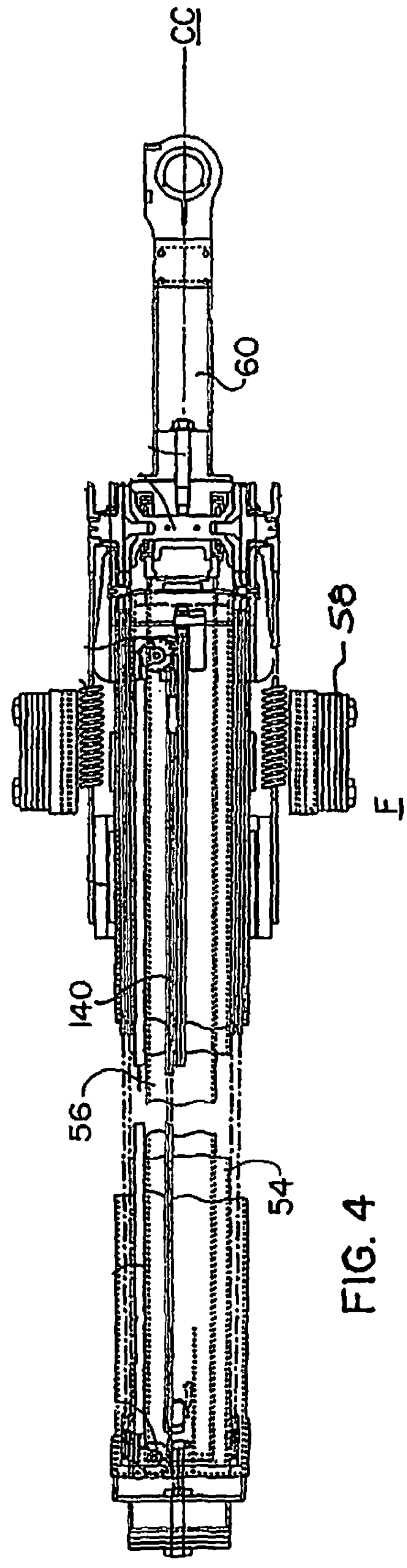
FIG. 4 is a plan view of the crane arm shown in FIG. 1.

A counter weight carrier or tray 50 is movable along the top of the first section 52, from a front or forward position, when the arm 35 is fully retracted, as shown in FIGS. 1, 4, and 5, to a rear or back position R when the arm 35 is fully extended, as shown in FIG. 2. Moving or mobile counter weights 58 are attached to the counter weight carrier 50. As shown in FIG. 3, the counter weight carrier 50 has top rollers or wheels 80 which roll on a roller track 82 attached to the top surface of the first section 52. The counter weight carrier 50 also has side rollers or wheels 84 which roll along the sides of the roller track 82. The top rollers 80 support the weight of the counter weight carrier 50 and moving counter weights 58, and allow the counter weight carrier 50 to roll between the front and rear positions with low force. The side rollers 84 keep the counter weight carrier 50 aligned, side to side, on top of the first section 52, and secure the counter weight carrier vertically against upward movement.

Referring to FIGS. 1 and 2, a nose plate 65 may be attached to a nose axle 196 pivotally attached at the front end of the third section 56. A riser or extension 60 can be attached to the nose plate 65 with a mounting bolt 200 and a quick release position pin 202.

In the configuration shown, an extension 60 is used, and a remote camera head 62 is attached at the front end of the extension 60. Alternatively, other camera support plates, risers, drop downs or accessories may be attached directly to the nose plate 65, with no extension 60 and/or camera head 62 being used. In the configuration shown, a camera 64 is attached to a camera platform on the camera head 62. The camera head 62, if used, can provide controlled angular camera movement about pan, tilt, and roll axes, independent of movement of the crane arm 35.

Figure 7:
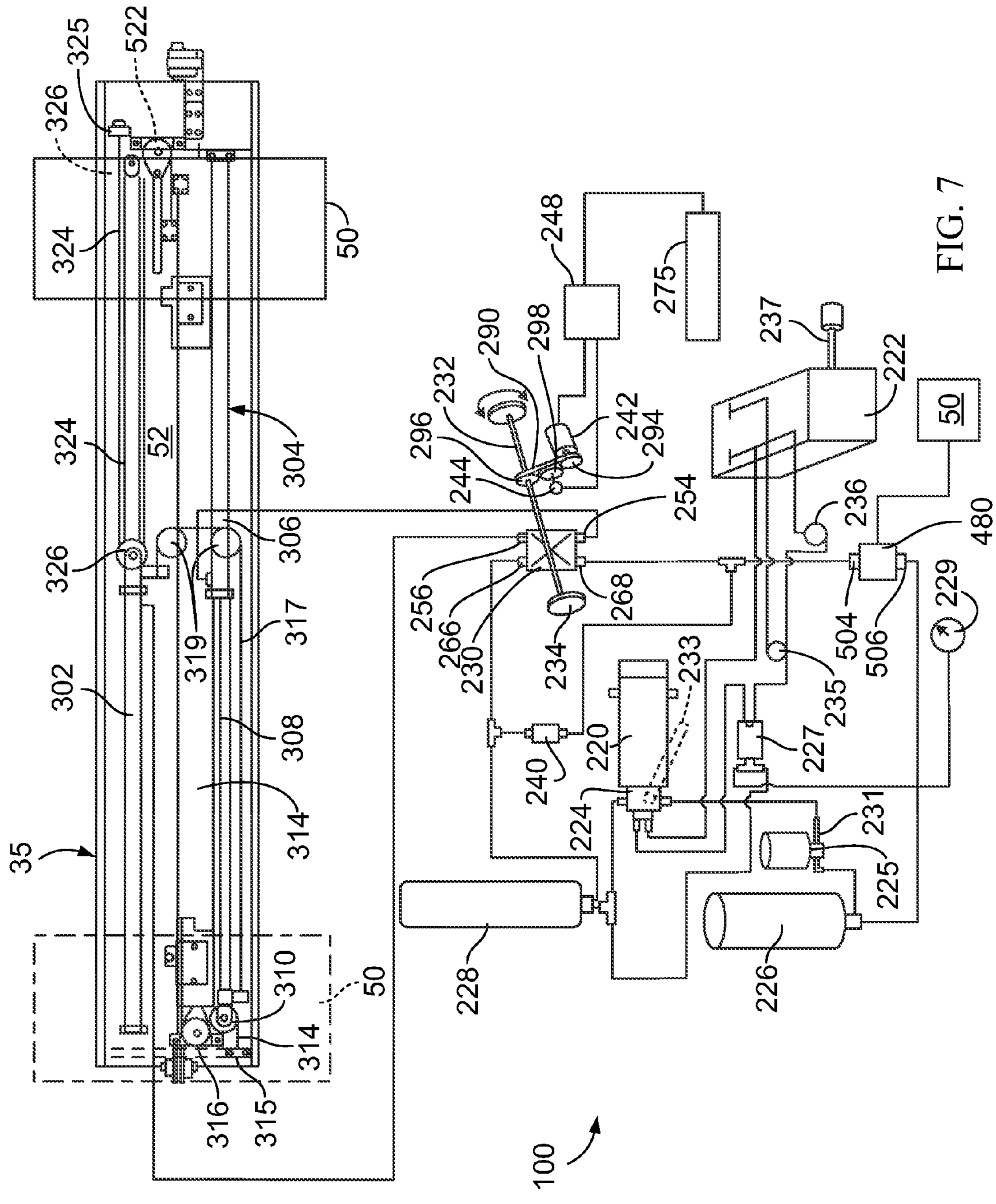
FIG. 7 is a schematic diagram of the hydraulic system of the crane shown in FIG. 1.

FIG. 7 shows a crane arm extension/retraction drive system having a first or retracting linear actuator 302 and a second or extending linear actuator 304. The actuators 302 and 304 may be hydraulic, electric, pneumatic, or use other drive means suitable for moving the counterweight carrier 50. Non-linear actuators for moving the counterweight carrier 50 may also be used, including rotary actuators or winches acting directly to pull on a cable attached to the counterweight carrier 50. In the embodiment shown in FIG. 7, the actuators 302 and 304 are linear hydraulic actuators. In FIG. 7, each of the actuators 302 and 304 has a cylinder 306 attached or fixed in place on the first section 52, and a piston or ram 308 moveable into and out of the cylinder via hydraulic power. The cylinder 306 of the first actuator 302 is attached towards the back end of the first section 52. The cylinder 306 of the second actuator 304 is attached towards the front end of the first section 52.

A retraction actuator pulley 326 is rotatably supported on a clevis at the end of the piston 308 of the first actuator 302. A retraction cable 324 has a first end 325 fixed or clamped near the front end of the first section 52. The retraction cable 324 runs or extends rearward from the first end 325, wraps around the pulley 326, runs forward and wraps around a forward idler pulley 322, then runs rearward and is attached to the counterweight carrier 50. The idler pulley 322 is rotatably attached to, and fixed in place on, the top surface of the first section 52, adjacent to the front end of the first section 52. As a result, when the actuator 302 retracts or pulls back, the counterweight carrier 50 is pulled forward to the position shown in solid lines in FIG. 7. This causes the arm 30 to pull back or retract.

Symmetrical with retraction components described just above, an extension actuator pulley 310 is rotatably supported on a clevis or other fitting at the end of the piston 308 of the second actuator 304. An extension cable 314 has a first end 315 fixed or clamped near the back end of the first section 52. The extension cable 314 runs or extends forwardly from the first end 315, wraps around the pulley 310, runs rearward and wraps around a rear idler pulley 316, then runs forwardly and is attached to the counterweight carrier 50. The idler pulley 316 is rotatably attached to, and fixed in place on, the top surface of the first section 52, adjacent to the back end of the first section 52. As a result, when the actuator 304 retracts (i.e., when the piston 308 is withdrawn into the cylinder 306), the counterweight carrier 50 is pulled rearward, towards the back of the first section 52, to the position shown in dotted lines in FIG. 7. This causes the arm 30 to extend. The cables 314 and 324 are primary cables. The actuators 302 and 304 act directly on these primary cables. Chains and sprockets can alternatively be used in place of pulleys and cables. The term pulley as used here includes sprockets, and the term cable as used here includes chains. The term cable here includes flexible elements having a single or multiple strands, wires, or fibers.

The crane arm 35 includes a drive system generally designated as 102, which extends and retracts the second section 54 and the third section 56, upon actuation of the hydraulic system. Referring to FIG. 3, a second section rear drive cable 140 (or pair of side-by-side cables) is attached to the top surface of the second section 54, via a cable tie, clamp, or turnbuckle 146, adjacent to the back end of the second section

54, extends around a rear pulley 144 attached to the back end of the first section 52, and is attached near the back end of the second section 54.

A second section forward drive cable 147 is attached to the counter weight carrier 50, extends forward around a front pulley 142, supported near the front end of the top surface of the first section 52, and is attached to the top surface of the second section 54, near the back end of the second section 54. Consequently, as the counter weight carrier 50 moves along the top of the first section 52, the second section 54 is moved by an equal amount, in an opposite direction.

The drive system 102, as shown in FIG. 3 also includes a top extending cable 152, and a symmetrical or mirror image or bottom extending cable 153. The back end of the top extending cable 152 is attached to a back wall of the first section 52 at a cable anchor or tie point 156. The top extending cable 152 extends forward, between the second section 54 and the third section 56, runs around a top drive pulley 150, secured to the inside top surface of the second section 54, and is attached at the rear top surface of the third section 56, via a cable anchor or turnbuckle 154. The top drive pulley 150 is mounted on the top inside surface of the second section 54, near the front end of the second section 54. The bottom extending cable 153 has the same design.

As the second section 54 is extended out of the first section 52, via movement of the counter weight carrier 50 driven by the hydraulic system, the drive pulleys 150 (one each on the top and bottom of the second section 54) pull the third section 56 out of the second section 54). Accordingly, when the hydraulic cylinder 304 is actuated to extend the crane arm 35, the third section 56 extends out of the second section 54 by the same amount (and in the same direction) as the second section 54 extends out of the first section 52. This rearward movement of the counter weight carrier 50 forces the forward movement of the third section 56 at double the (rearward) movement of the counter weight carrier.

The drive system 102 similarly also includes a top retraction or pull back cable, and a bottom retraction or pull back cable. The first or front end of the top pull back cable is attached to the top inside surface of the first section 52, with a cable anchor or turnbuckle. The top pull back cable then extends rearward, between the first section 52 and the second section 54, to a retraction pulley mounted on the top back end of the second section 54. The bottom extension and retraction cables and pulleys are duplicates of the top cable and pulley designs. Top and bottom cables and pulleys are used to provide smooth and more evenly balanced telescoping movement of the sections. However, single cable designs may also be used. Chains and sprockets may also be used in place of cables and pulleys.

The top retraction or pull back cable extends around the top retraction pulley, passes through the slot or opening in the second section, and is attached to the top back end of the third section 56 with at the cable anchor or tie 156. The bottom pull back cable has the same design. Both retraction or pull back pulleys are oriented in a plane P at an angle of 20-45 degrees, preferably 30 degrees, to allow the pulleys to fit within a compact space between the second and third sections.

As the second section 54 is retracted or pulled back into the first section 52 the top and bottom retraction pulleys on the second section 54 move rearward with the second section 54, pulling the third section 56 back into the second section 54. As the counter weight carrier 50 is driven rearward, the second section drive cable (or pair of cables) 140 drives the second section 54 forwardly. This forward movement by the second section 54 simultaneously drives the third section 56 forwardly, via the forward movement of the third section drive pulleys (both attached to the second section 54) acting on the top and bottom extending cables 152 and 153. As a result, the third section 56 moves outwardly to the desired camera position.

The first actuator 302 acts as a retraction actuator as it pulls the counterweight carrier forward (to the position shown in solid lines in FIG. 7), which causes the arm to retract. The second actuator 304 acts as an extension actuator as it pulls the counterweight carrier 50 rearward towards the back of the first section 52 (to the position shown in dotted lines in FIG. 7), which causes the arm to extend. A synchronization cable 317 extends around idlers 319 and connects the clevis ends of the pistons of the actuators together. The synchronization cable 317 causes the pistons to move in equal and opposite directions.

The design and operation of these other hydraulic system components, which are generally located within a hydraulic system enclosure or housing 106 attached to the bottom of the first section 52, is described below. The hydraulic system 100 is shown in detail in FIGS. 6, 7, 8A and 8B. The hydraulic system 100 provides the motive force for moving the counter weight carrier 50 and simultaneously extending or retracting the crane arm 35. In normal and preferred operation, the crane arm 35 is balanced. Referring to FIG. 4, forward, or upward, movement of the payload is compensated by rearward or downward movement of the counter weight carrier 50 and the mobile counter weights 58. Accordingly, the hydraulic system 100 generally needs only to overcome forces of friction and inertia, to extend or retract the crane arm 35. The components making up the hydraulic system 100, which are shown in FIG. 7, are preferably contained within the hydraulic system housing 106, except for the hydraulic actuators 302 and 304, which are on the top surface of the first section 52.

Figure 8A:
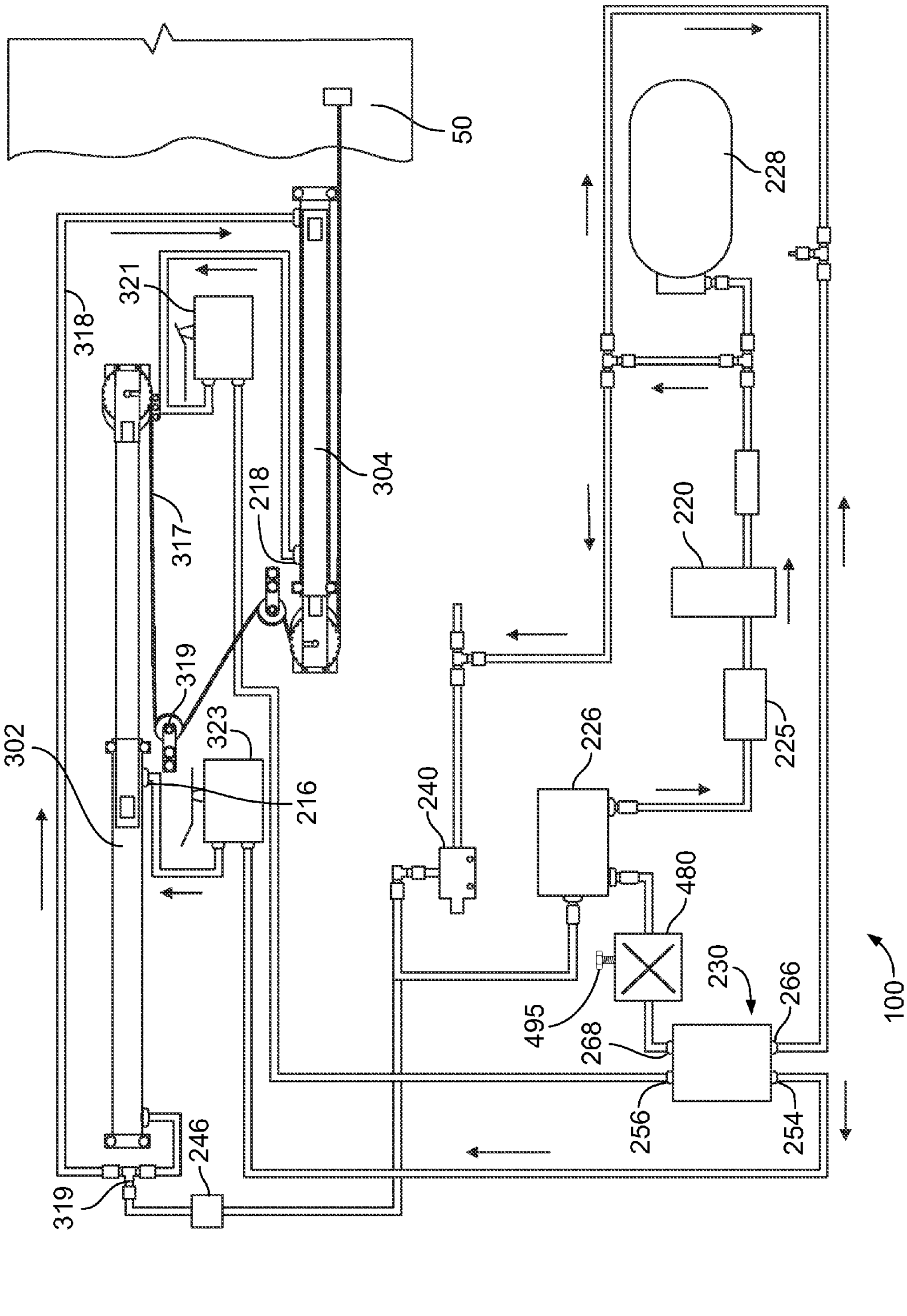
FIGS. 8A and 8B are schematic views of the hydraulic system shown in FIG. 7 with additional components shown.
Figure 8B:
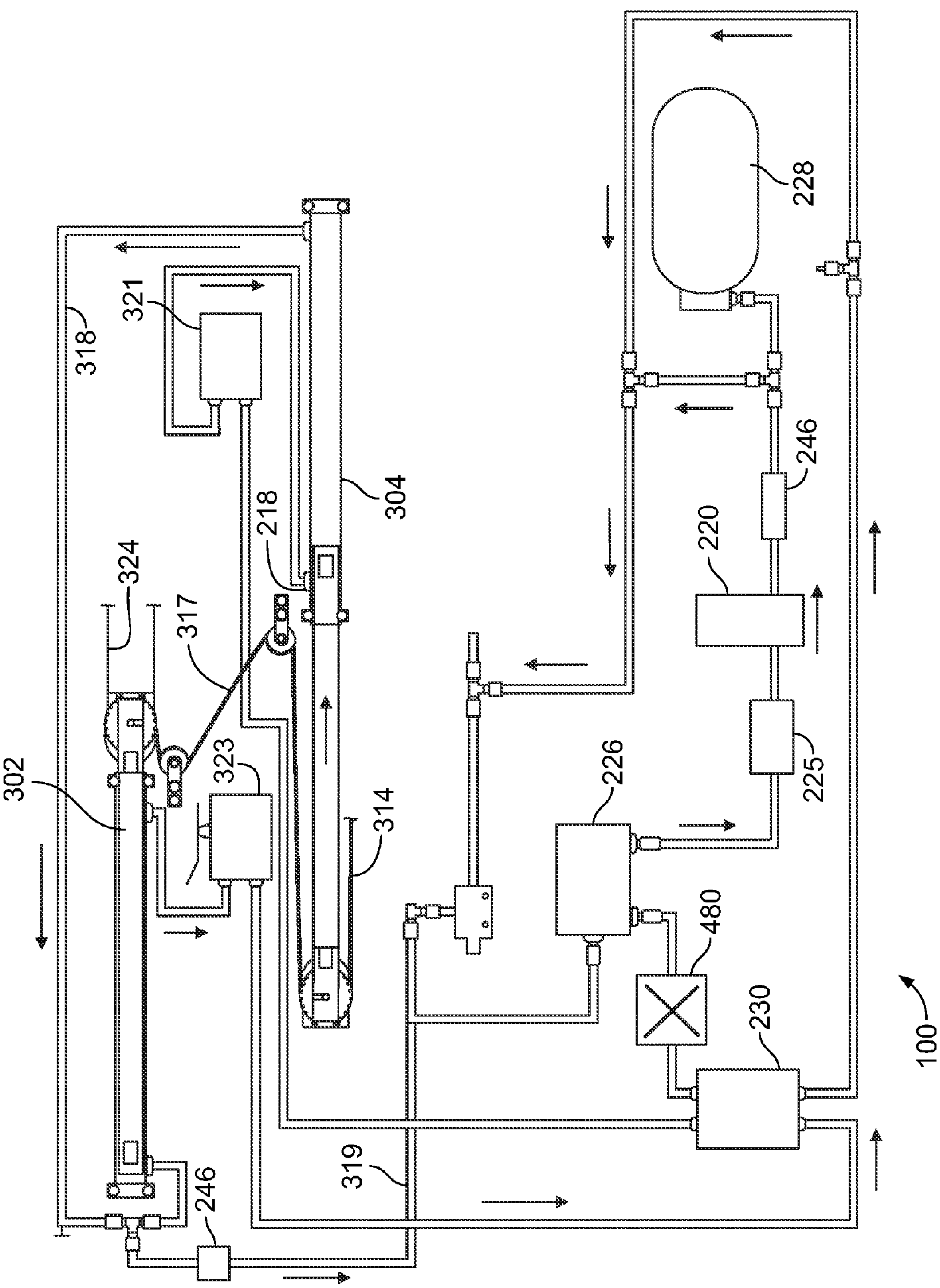
Figure 10:
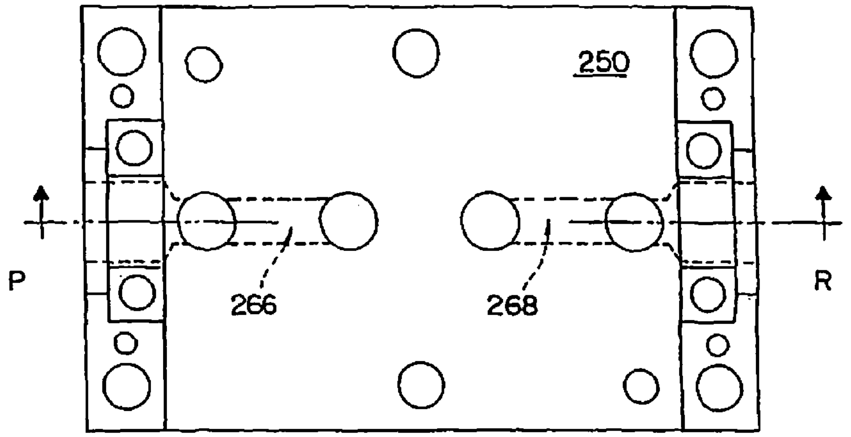
FIG. 10 is a top view of the valve shown in FIG. 9A, with the cam shaft removed for illustration.

As shown in FIGS. 7, 8A and 8B, a pump 224 driven by an electric motor 220 charges or pressurizes an accumulator 228. Instead of the motor 220, a hand pump 233 may be used. The battery 222, which is typically mounted on the deck of the vehicle 32, can be charged by an external AC plug-in connection 237. The accumulator 228 is connected via fluid lines to a control valve 230, and also to a pressure switch 227, which automatically switches off the motor 220 when a pressure limit is reached within the accumulator 228. A pressure gauge 229 linked to the accumulator 228 is visible through a window or opening in the enclosure or housing 106.

The battery 222 connects to the motor 220 via a cable through an on/off switch 236 and the pressure switch 227. An on/off indicator 235 is viewable through a window or opening in the enclosure 106. A relief valve 240 joins into a T-fitting in the line linking the accumulator 228 and the valve assembly 230, to relieve excess pressure in the accumulator 228, and return hydraulic fluid to a reservoir or tank 226. The reservoir 226 provides un-pressurized hydraulic fluid, through a filter 225 and a check valve 231 to the inlet of the pump 224.

A sprocket 296 is attached to a valve shaft 232 on the valve assembly 230. A chain or belt 290 connects the shaft sprocket 296 on the valve shaft 232 with a motor sprocket 294 on a valve control motor 242. An adjustment and potentiometer idler sprocket 298 may be also engaged with the chain 290. The chain may also wrap around a sprocket on the potentiometer 244. The potentiometer 244 and the valve control motor 242 are preferably both connected to an electronic controller 248. The potentiometer 244 may have a small cable transducer attached to the counter weight carrier and to provide electrical signals to the controller 248 based on position, and speed and direction of movement of the counterweight carrier, which is proportional to the extension position of the arm 35. Stops limit rotation of the valve 230.

Referring to FIGS. 9A-12, the control valve assembly 230 includes a valve block 250 attached to a base 252. First, second, third, and fourth valve pins 259, 261,263, and 265 are positioned within first, second, third, and fourth bore 258, 260,262, and 264 in the valve block 250 and base 252, forming four valves. The first bore 258 connects with the third bore 262 via a first or rear drive port 254, as shown in dotted lines in FIG. 11. Similarly, the second valve bore 260 connects with the fourth valve bore 264 via a second or front drive port 256, also shown in dotted lines in FIG. 11. Plugs 269 seal drill openings made during manufacture, to provide right angle bends in the internal ports.

The first drive port 254 of the valve assembly 230 is connected to a front port 216 of the first or left hydraulic cylinder 302. The second drive port 256 of the valve 230 is connected via a hydraulic line to a front port 218 of the second or right hydraulic cylinder 304, as shown in FIGS. 7, 8A and 8B. A high pressure inlet port 266 of the control valve 230 is connected via a hydraulic line to the accumulator 228. A return port 268 is connected via a return hydraulic line to the reservoir 226.

As shown in FIGS. 8A and 8B, the back or closed end of each hydraulic cylinder is connected to an air reflow line 318. As the piston of one cylinder advances, the air trapped behind that piston is pushed out of the cylinder, into the air reflow line, and into the closed back end of the other cylinder. This provides a closed system to better resist corrosion and contamination. The air reflow line may have a drain branch 319 leading to the reservoir 226. Any hydraulic fluid that gets past the seal between the piston and cylinder can accordingly be returned back to the reservoir 226 through a drain line 319 and a check valve 246. Also as shown in FIGS. 8A and 8B, front and rear stop valves 321 and 323 are mechanically actuated at the end of the stroke of the piston. The stop valves 321 and 323 consequently shut off flow of hydraulic fluid into the cylinders before the piston hits a hard mechanical stop in the cylinder. FIG. 8A shows the crane arm retracted with the arrows showing the direction of fluid flow for extending the crane arm. FIG. 8B shows the crane arm extended with the arrows showing the direction of fluid flow for retracting the crane arm.

Figure 9A:
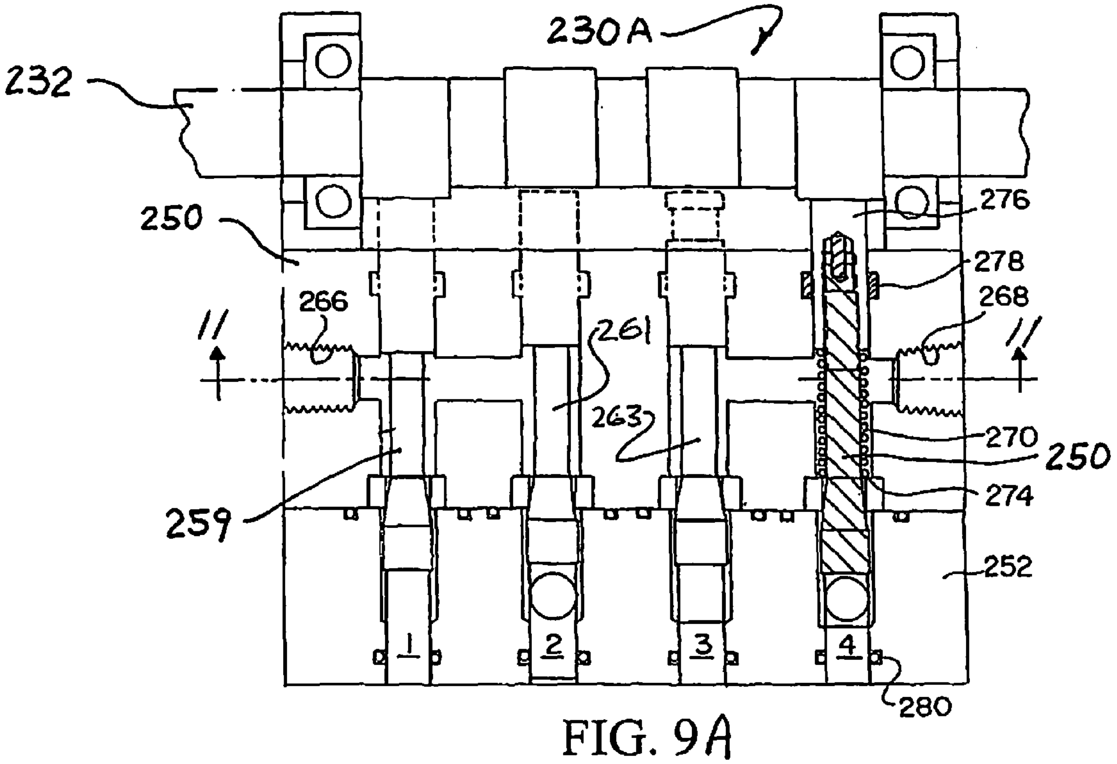
FIG. 9A is a section view of the hydraulic control valve shown in FIG. 7.

As shown in FIG. 9A, each of the valve pins 259,261, 263, and 265 is biased upwardly or into a closed position via a spring 270. In the up or closed position, a head on the hardened valve pin provides a near seal against a hardened valve seat 274 pressed and/or swaged into the valve body at the lower end of each bore. A valve piston 276 is centered on a shoulder and threaded onto each of the valve pins. The springs 270 bias the valve pistons 276 against cam lobes 272 on the valve shaft 232. The dimensions of the valve pins and the cam lobes establish the near seal of each of the ports 254, 256, 266 and 268 when the pins are in the up or closed position. Alternatively, the near seal may of course be made in other ways, such as with grooves or bores allowing hydraulic fluid by by-pass the valve seat. The near seal of each bore allows a small amount of flow through the bore, even when the pin in the bore is in the “fully” closed position. As a result, regardless of the position of the valve 230, at least some hydraulic pressure from the high pressure port 266 is applied simultaneously to both the extension port and the retraction port. As a result, both cylinders 302 and 304 continuously exert at least a threshold pulling force on the cables 314 and 324.

Figure 9B:
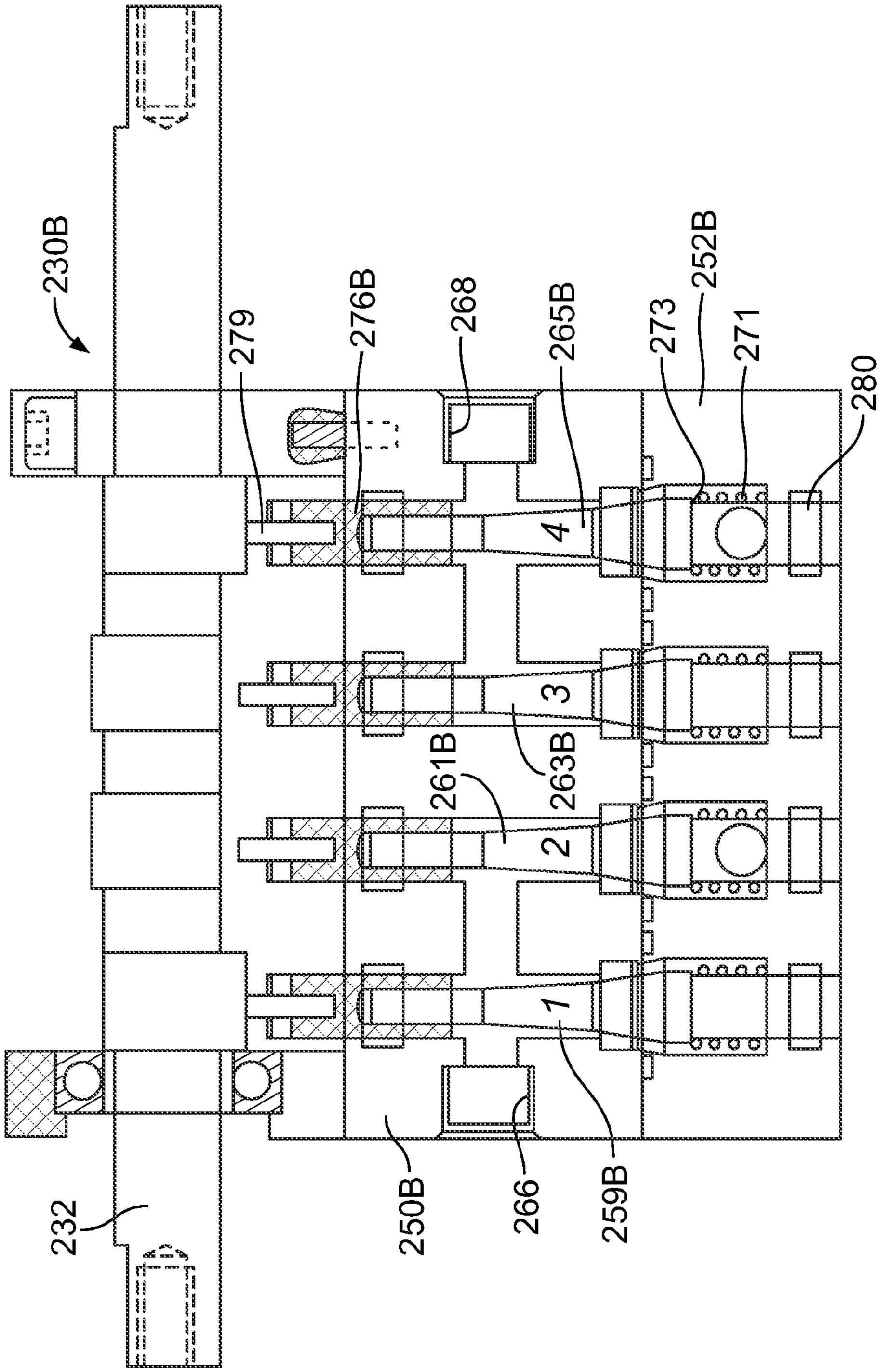
FIG. 9B is a section view of an alternative hydraulic control valve.

FIG. 9B shows an alternative hydraulic control valve 230B which is similar to the valve 230A shown in FIG. 9A. The element numbers in FIG. 9B having a B suffix generally correspond to element with the same number in FIG. 9A. The valve 230B is different from the valve 230A as follows. Referring to FIG. 9B, in the valve 230B, springs 271 are placed in a base 252B of the valve 230B, rather than in the valve block 250B. As a result flow passageway around the valve pins is left relatively open. This reduces flow resistance through the valve 230B. In addition, rollers 279 are provided on the valve pistons 276B. The springs 271 push on a collar 273 on each pin, holding the rollers 279 into contact with the cams on the shaft 232. The rollers roll on the cams when the shaft 232 is turned to control the valve. The rollers reduce friction and help to provide smooth and quiet valve operation.

The near seal typically closes off 95% to 99.99% of the cross sectional area of the bore. The more opening left by the near seal, the greater the crane arm movement sensitivity will be to the control valve movement. On the other hand though, use of a more open near seal to achieve greater sensitivity also requires greater hydraulic energy use. In the design shown, the accumulator 228 operates with a pre-charge pressure of about 1800 psi and the pump 220 turns off when the accumulator pressure reaches about 2500 psi. Each full stroke (extension or retraction of the arm) uses about 100 psi of accumulator charge. When fully charged, the accumulator can provide about seven full strokes, within the operating parameters of the system. With this accumulator capacity, the near seal generally may be set up to allow an average minimum pressure drop of about 50 psi in 5 minutes, to a average maximum pressure drop of about 150 psi in 30 seconds. In the example shown, the leakage provided by the near seal allows a pressure drop from about 2500 psi to about 2400 psi in about 90 seconds.

The cam lobes are preferably 90 degree offset circles, to provide smooth (sinusoidal) movement of the valve pins. As shown in FIG. 9A, 0-rings 278 and 280 seal the pin bores. The valve shaft 232 may be set up with stops that limit rotation to about +/−85 degrees. This allows for complete valve control, without the need to remove and reposition the users hand on the control knob 234. Referring to FIG. 7, using a potentiometer 244 having a 170 degree range of movement in one direction, plus 170 degrees in the other direction, and 2:1 tooth ratio between the shaft sprocket 296 and the sprocket 298, allows for use of the potentiometer over its entire range, for greater control sensitivity. As the valve shaft 232 is turned, either manually by gripping and turning the control knob 234, or automatically via the valve control motor 242 and electronic controller 248, the ports in the valve assembly 230 are opened and substantially closed.

Figure 13:
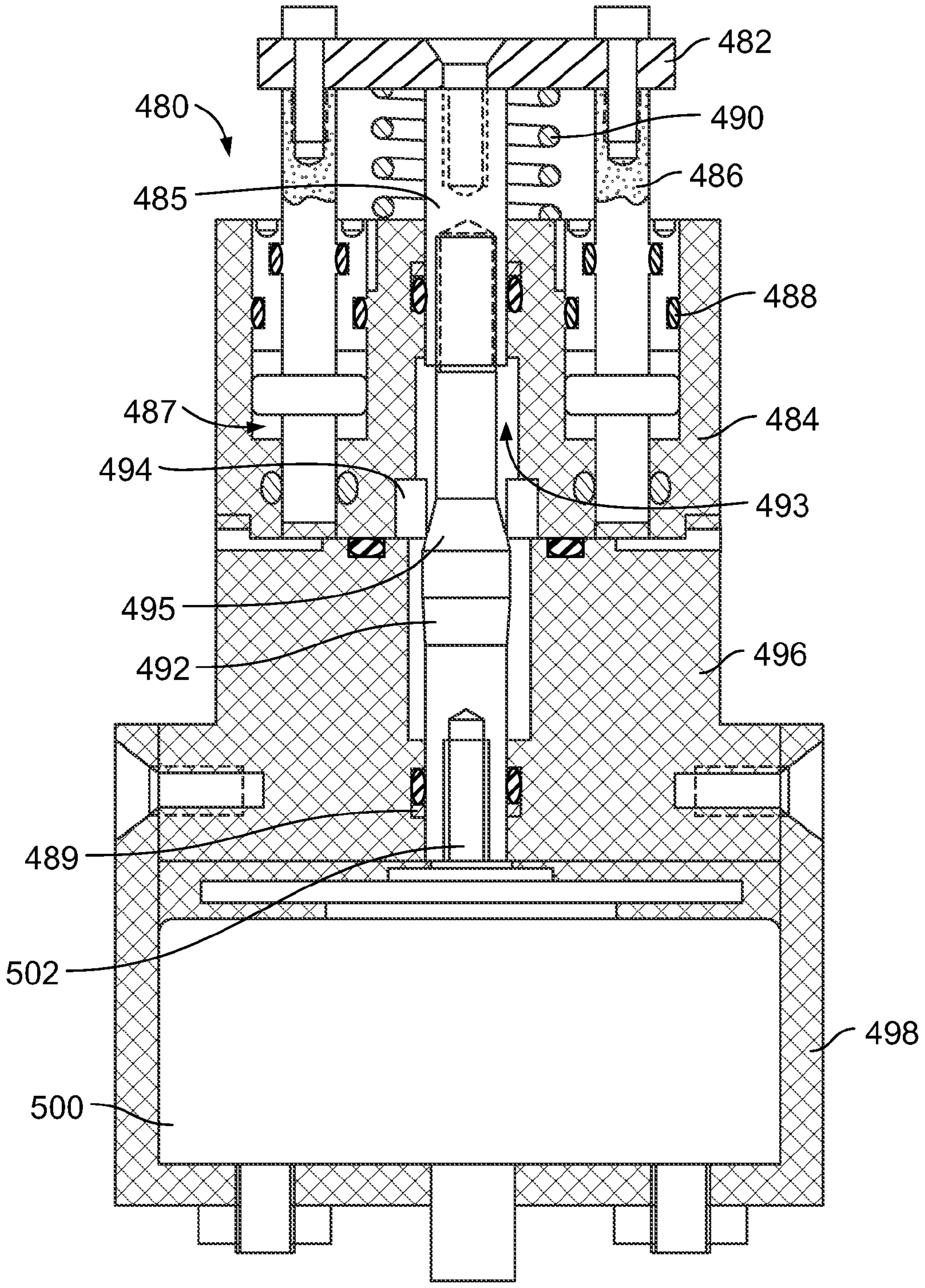
FIG. 13 is a front section view of a shutoff valve for use in the hydraulic system shown in FIG. 7.
Figure 14:
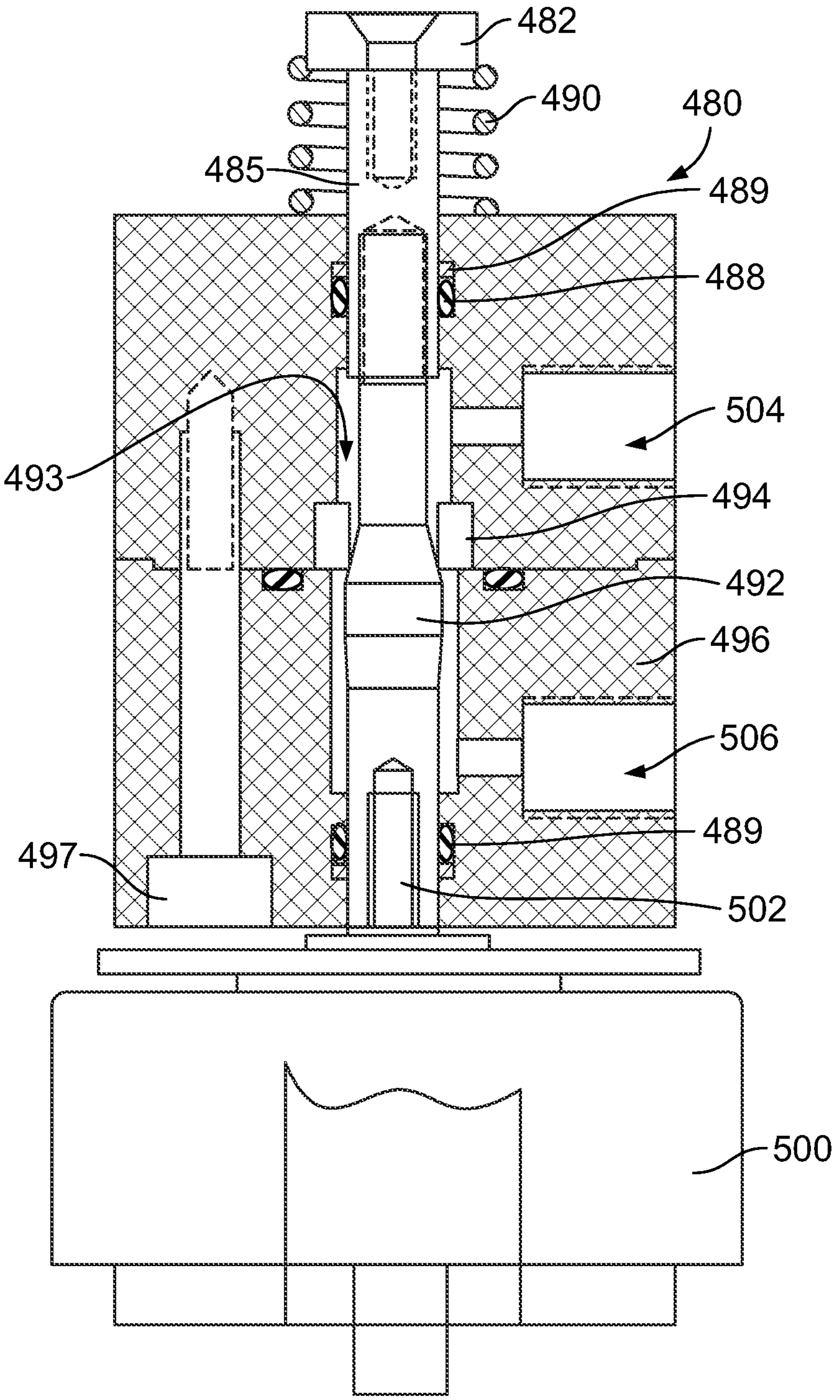
FIG. 14 is a side section view of the shutoff valve shown in FIG. 13.

As shown in FIGS. 7, 8A and 8B, a stop valve 480 is positioned in the line connecting the return port 268 of the control valve 230 and the reservoir 226. As shown in FIGS. 13 and 14, the stop valve has a pin plate 482 attached to a pair of spaced apart dampener shafts 486. The dampener shafts extend into dashpots in an inlet body 484 which viscously dampen movement of the shafts 486. The pin plate 482 is biased away from the inlet body 484 (upwardly in FIGS. 13 and 14) via a compression spring 490. An outlet body 496 is attached to the inlet body 484 via cap screws 497 as shown in FIG. 14. A valve bore 493 extends through the inlet and outlet bodies. A pin 492 having a shoulder 495 is positioned in the bore 493. The first or top end of the pin 492 is attached, e.g., threaded into, a pin stub 485 on the pin plate 482. The bore 493 connects between an inlet port 504 and an outlet port 506. The inlet port 504 is connected via a hydraulic line or tube to the return port 266 of the control valve 230. The outlet port 506 is connected via a hydraulic line to the reservoir 226.

The shaft 502 of a solenoid or actuator 500 is attached to the second or bottom end of the pin 492. The solenoid 500 is attached to the outlet body 496 via a solenoid cup 498. The shoulder 495 of the pin 492 is movable into engagement against a valve seat 494, to create a seal and stop flow of hydraulic fluid through the bore 493. O-rings 488 and backing rings 489 may be used to provide seals between the components as shown in FIGS. 13 and 14.

Via operation of the spring 490, the stop valve 480 is normally closed. The spring pushes the pin plate 482 up, which forces the shoulder 495 into sealing contact with the valve seat 494. However, during normal crane arm operation, electrical current is provided to the solenoid 500, which pulls the pin down, against the spring force, and holding the shoulder 495 away from the seat 494, to leave the bore 493 open. With the stop valve open, hydraulic fluid can flow freely through the stop valve, and the stop valve does not then affect operation of the crane arm.

When in the “off” position, the control valve 230 remains slightly open. Hence, in the “off” position, the valve 230 is set up to balance the hydraulic force applied by the actuators 302 and 304. In this condition, the primary cables 314 and 324 are under tension since the actuators are pulling on them, respectively. However, no movement occurs as the opposing forces exerted are equal. When the valve shaft 232 is turned in a first direction, (manually via the knob 234, or automatically via the motor 242 and controller 248), the bore in the valve 230 supplying hydraulic fluid to the port 218 on the extending hydraulic cylinder 304 is opened up more than the bore in the valve 230 supplying hydraulic fluid to the port 216 on the retracting hydraulic cylinder 302. As a result, the extending force acting on the counter weight carrier 50. This causes the counter weight carrier to move rearward on the first section 52. This causes the second and third sections 54 and 56 to telescopically extend, as described above. To reverse direction and retract the crane arm 35, the valve shaft is turned back (counter clockwise in FIG. 7) through the stop or closed position, causing the reverse movement. The speed of extension and retraction will increase with increasing movement of the valve shaft away from the “closed” position, due to the shape of the cams. Since the valve assembly 230 is pressure compensated, only small amounts of force are required to turn the valve shaft 232. Since the near seal of the control valve 230 keeps the primary cables in constant tension and the “closed” position provides a balanced force equilibrium condition, even slight movement of the valve shaft 232 away from the “closed” position (e.g., by 0.1 degrees) results in immediate crane arm movement. While such slight movement will cause very slow crane arm movement, the movement, nevertheless, is immediate. Control of the crane arm movement can accordingly be highly sensitive.

The controller 248 can be set up or programmed to actuate the valve control motor to operate the valve assembly. This allows the crane arm 35 to automatically move to pre-selected positions, or to perform pre-programmed movements. A remote control box 275 may be similarly programmed, with positions or movements (pan, tilt, telescope extend/retract) for the entire crane 30, and/or the camera head 62.

The crane arm 35 is designed and operates in substantially the same way as in U.S. Pat. Nos. 7,121,745; 7,128,479; 7,252,441; 7,311,454 and U.S. Patent Publication 2008/0002967, each incorporated herein by reference. However, the control valve 230 provides only a near seal of the ports, and not a complete seal. As a result, regardless of the position of the control valve 230, each of the hydraulic cylinders is constantly provided with at least a minimum amount of hydraulic fluid pressure, referred to here as residual fluid pressure. When the arm is extending or retracting, the residual fluid pressure applies at least a residual minimal force opposite to the direction of movement. The residual force maintains the extension cable 314 and the retraction cable 324 under constant tension. Consequently, when the control valve is moved to extend or retract the crane arm 35, the crane arm moves virtually instantaneously, because the force equilibrium is removed, and the primary cables have no slack, and undergo little or no additional stretching.

When the control valve 230 is in the stopped or neutral position, both actuators 302 and 304 are supplied with residual fluid pressure and act against each other. No movement occurs however because the opposite forces exerted are equal and balanced. Movement of the control valve 230 away from the stopped position, even slightly away; accordingly results in virtually immediate responsive movement of the crane arm 35. The crane arm 35 thus provides highly sensitive and rapid response to use of the control valve. If the stop valve is used as an emergency stop, the stopping action is smooth and quiet.

Referring to FIGS. 8A and 8B, since a small amount of fluid is constantly flowing through the control valve 230, the pressure charge in the accumulator 228 is lost over time, even with no crane arm movement. The motor 220 must therefore periodically switch on to drive the pump 224 and maintain a charge in the accumulator 228, even if the crane arm 35 is idle. Referring to FIGS. 7, 8A and 8B, 13 and 14, the stop valve 480 is positioned in the line connecting the return port 268 of the control valve 230 to the reservoir 226. The stop valve 480 is held open via the solenoid 500 during normal crane arm operations. When in the open position, the stop valve 480 allows substantially free flow of hydraulic fluid from the control valve 230 to the reservoir 226. When the shut off valve is open, arm movement is controlled by the control valve 230.

When the crane arm 35 will not be extended or retracted for a prolonged period of time, for example during a lunch break, or overnight, the stop valve 480 may be closed by switching off electrical power to the solenoid 500. When this occurs, the spring 490 pulls the sealing surface 495 of the pin 492 into sealing contact against the valve seat 494. The dashpots 487 dampen this movement so that the stop valve 480 stops flow through the bore 493 quickly but smoothly, but without having the surface 495 impact against the seat at high speed.

Referring to FIGS. 7, 8A and 8B, with the stop valve 480 closed, flow of return fluid to the reservoir 226 is stopped, regardless of the position of the control valve. As a result, all movement of the actuators 302 and 304 and all extending or retracting movement of the arm 35 is stopped. Unlike the near seal provided by the control valve 230, the stop valve 480 is designed to provide a complete seal which stops all return fluid flow to the reservoir. This stops any arm movement. The stop valve 480 is normally closed via the spring 490 and is held open via the solenoid 500. In the even of an electrical power failure, current to the solenoid is interrupted, and the stop valve 480 closes, automatically stopping extending/retracting movement of the crane arm 35. As shown in FIGS. 8A and 8B, the stop valve 495 may be provided with a mechanical override 495. The mechanical override 495 is manually operated to mechanically open the stop valve 495 during an electrical failure. Use of the mechanical override allows extension/retraction movement of the crane arm 35, using the charge in the accumulator, without the need for electrical power. The mechanical override may be designed as threaded screw on the outlet body aligned to push on the pin 492.

The solenoid 500 may also be connected to one or more wired or wireless switches, on or off of the crane arm 35 and/or the mobile base 32. These switches may be used by the crane operator, or other production crew members, to stop movement of the arm, regardless of the control valve position. Electrical current provided to the solenoid 500 may be controlled by a current controller 503. The current controller 503 may provide an initial higher current to open the valve 480, and then a reduced lower current to hold the valve open. This reduces the current consumed by the solenoid and reduces solenoid heating.

Depending on leakage provided by the near seal, and other system parameters, and especially with systems designed to be very highly sensitive to control valve movements, using an electronic off-position selector may be helpful. With a highly sensitive system, completely stopping all arm movement may be difficult to achieve by hand, because even a slight deviation from the precise off position of the control valve will cause arm movement. The electronic off-position selector, if used, is connected to, or is built into, the controller 248. By detecting direction and speed of movement of the counter weight tray 50 via an encoder and potentiometer, the electronic off-position selector can quickly and accurately move the control valve into the off position, to stop all arm movement.

Figure 15:
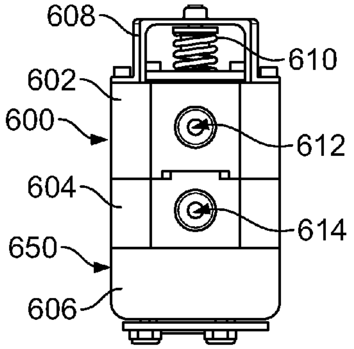
FIG. 15 is a front view of an alternative design shutoff or stop valve.
Figure 16:
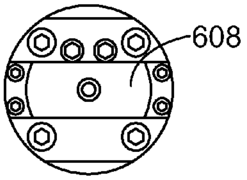
FIG. 16 is a top view of the stop valve shown in FIG. 15.
Figure 17:
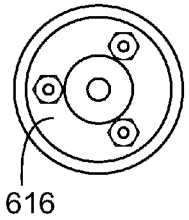
FIG. 17 is a bottom view of the stop valve shown in FIG. 15.

FIGS. 15-30 show an alternative stop valve 600. The stop valve 600 may used in place of the stop valve 480 described above and shown in FIGS. 13-14. As shown in FIGS. 15-17, the stop valve 600 has a dampener body 602 attached on top of a valve seat body 604. A coil housing 606 is attached to the bottom of the valve seat body 604. A spring 610 is compressed under a spring cap 608 on top of the dampener body 602. An inlet port 612 is provided in the dampener body 602 and an outlet port 614 is provided in the valve seat body. The stop valve 600 can be connected into the crane hydraulic system as a direct replacement of the stop valve 480, with the return line connected to the inlet port 612 and the outlet port 614 connected to the accumulator. The terms top and bottom are used here only for descriptive purposes as the actual orientation of the valve 600 relative to gravity is not relevant to the design and operation of the valve.

Figure 18:
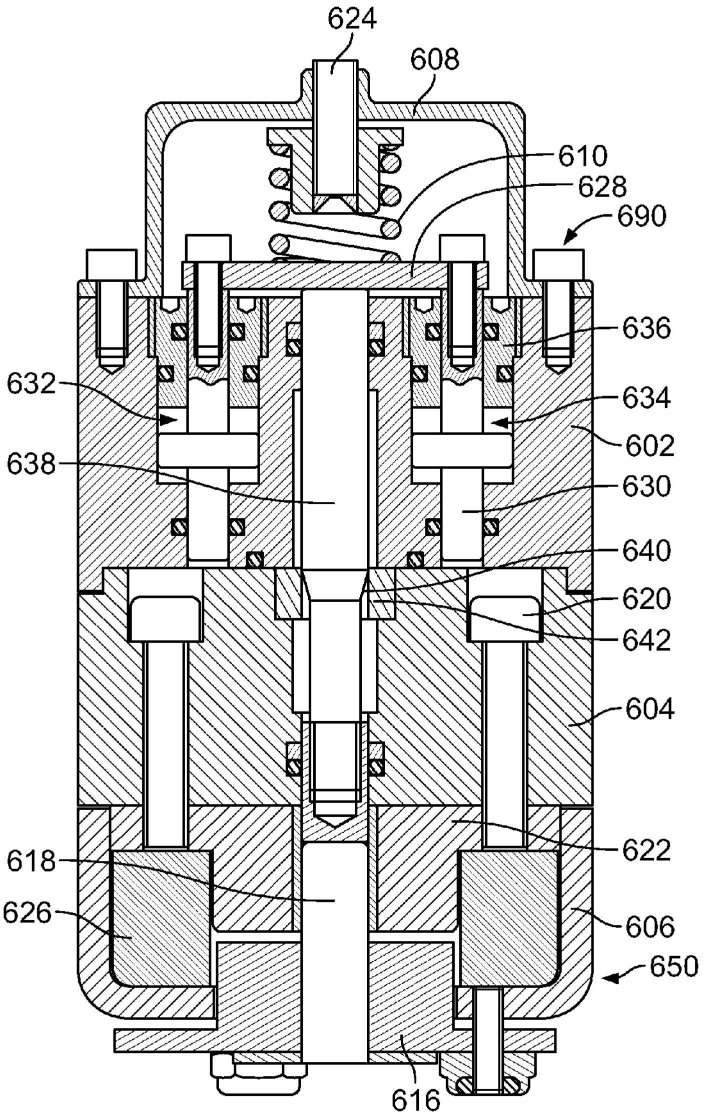
FIG. 18 is a section view of the stop valve shown in FIGS. 15-17.
Figure 20:
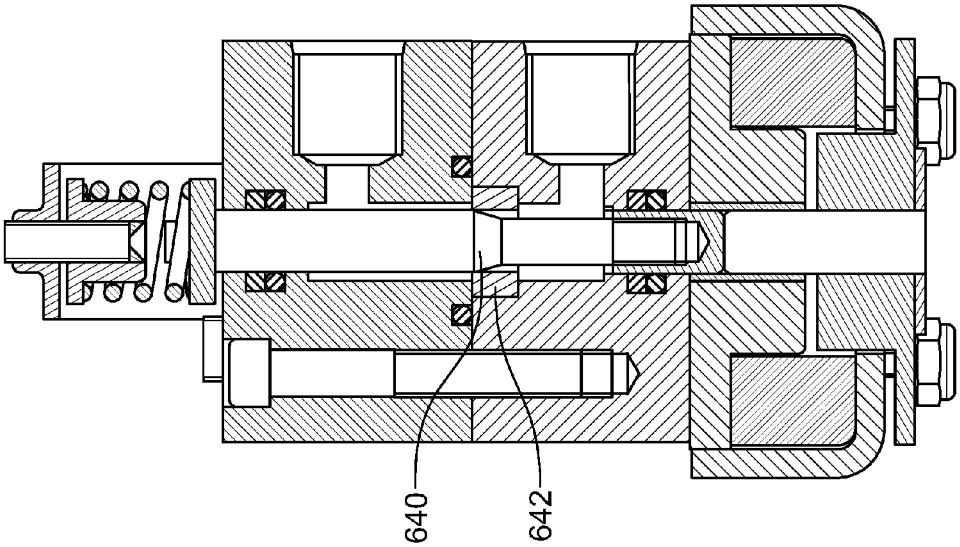
FIG. 20 is a second section view of the stop valve shown in FIGS. 15-17, with the valve in a closed position.
Figure 19:
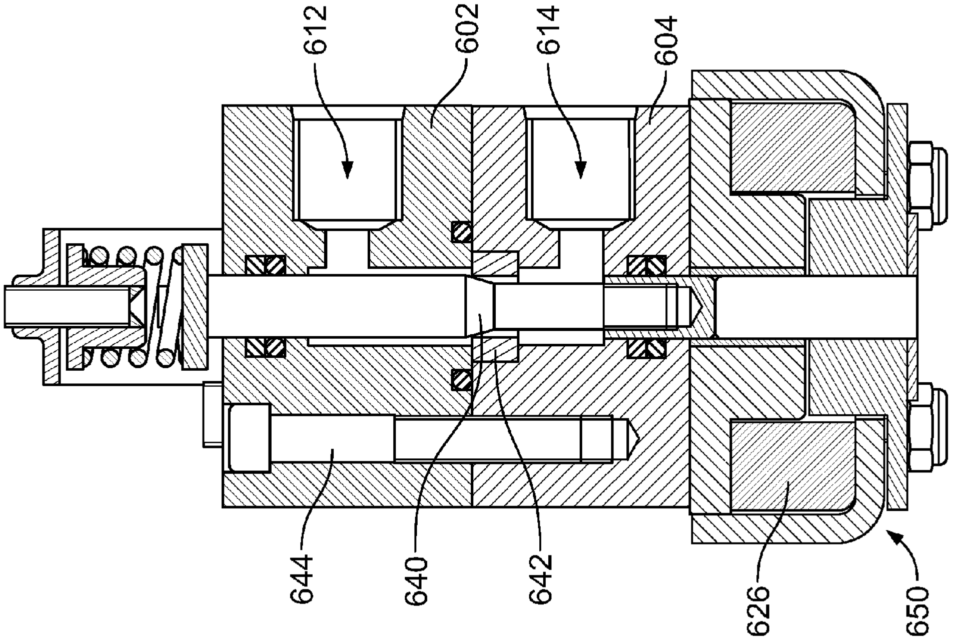
FIG. 19 is a second section view of the stop valve shown in FIGS. 15-17, with the valve in an open position.

Turning now to FIGS. 18-20, a valve pin 638 having a shoulder 640 is movable in a bore in the dampener body 602 and the valve seat body 604. The 600 is opened and closed by moving the shoulder 640 out of and into contact with a valve seat 642. The spring 610 urges the valve pin 638 into the closed position shown in FIG. 20. A coil 626 surrounds a base 622 and a piston 618 is positioned against the lower end of the valve pin 638. An armature 616 is attached to the piston 618. The coil 626, base 622, piston 618 and armature 616 form a solenoid 650. The valve 600 is opened by applying electrical current to coil 626, which pushes the valve pin 638 away from the valve seat 640, allowing fluid to flow from the inlet port to the outlet port.

The base 622 and the other solenoid elements attached to it may be attached to the valve seat body 604 via cap screws 620, as shown in FIG. 18. Similarly, the dampener body 602 may be attached to the valve seat body 604 using cap screws 644, as shown in FIGS. 19 and 20. The spring cap 608 may also be attached to the dampener body by cap screws as shown in FIG. 18. A spring adjuster 624 on the spring cap may be used to adjust the spring force acting on the valve pin 638.

As shown in FIG. 18, dampener pins 630 are provided in first and second, or left and right cylinders 632 and 634. The cylinders 632 and 634 are sealed via cylinder caps 636 and o-rings. Other components may similarly be sealed using o-rings, as shown in FIGS. 18-23. The dampener pins 630 are attached to pin plate 628 under the spring 610.

Figure 27:
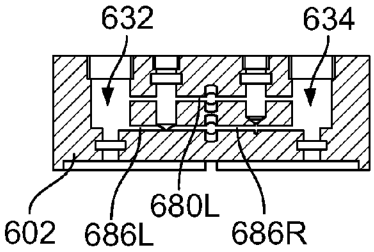
FIG. 27 is a section view taken along line A-A of FIG. 24.
Figure 25:
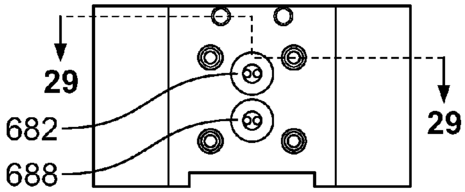
FIG. 25 is side view of the dampener body shown in FIG. 24.
Figure 28:
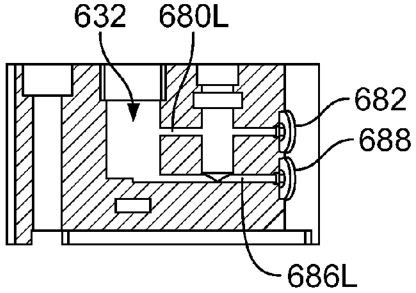
FIG. 28 is a section view taken along line B-B of FIG. 24.
Figure 26:
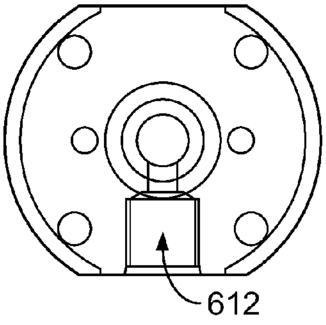
FIG. 26 is a bottom view of the dampener body shown in FIG. 25.
Figure 29:
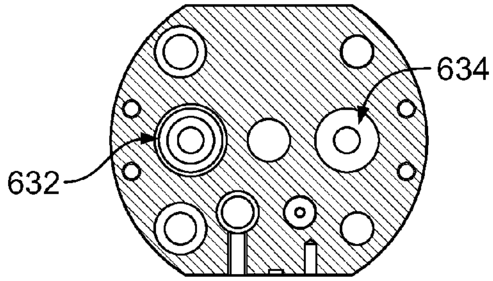
FIG. 29 is a section view taken along line C-C of FIG. 25.
Figure 30:
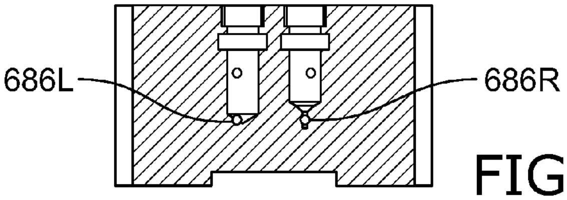
FIG. 30 is a section view taken along line D-D of FIG. 24.

Referring now to FIGS. 21-24 and 27, upper and lower bores 680L and 686L extend through the dampener body from upper and lower ports in the left cylinder 632 to upper and lower junctions or recesses 682 and 688 on the side of the dampener body 602. Upper and lower bores 680R and 686R extend through the dampener body from upper and lower ports 666 and 668 in the right cylinder 634 also to the upper and lower junctions 682 and 688, creating pathways connecting the upper and lower ports of the left and right cylinders, as best shown in FIG. 27.

Figure 21:
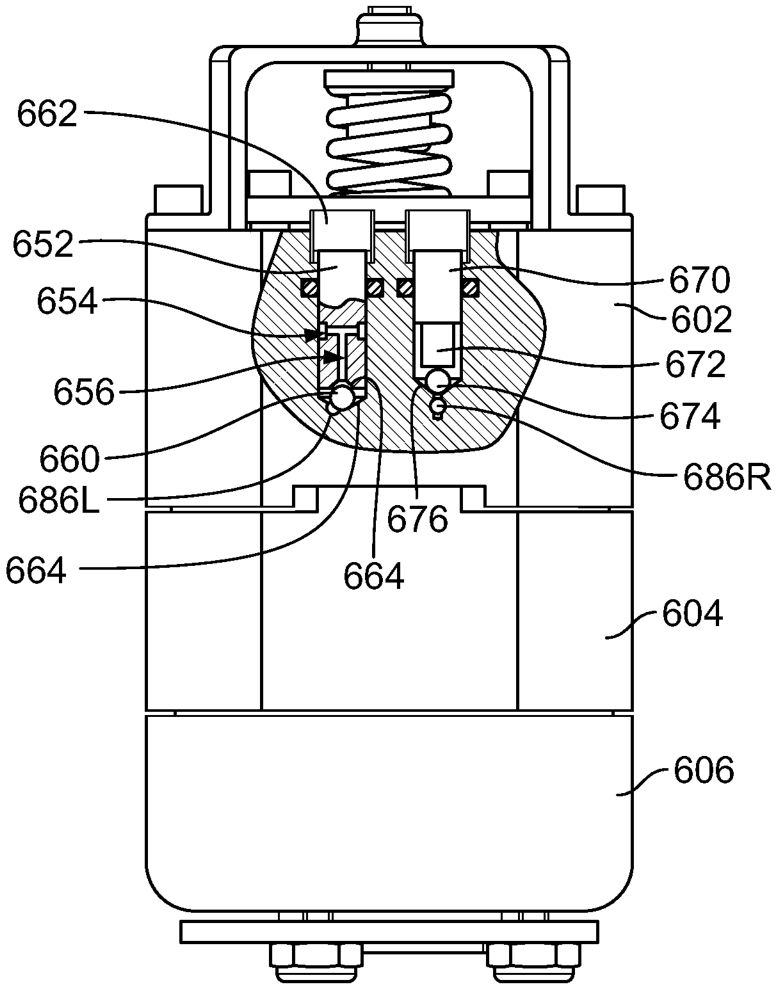
FIG. 21 is side view in part section of the stop valve shown in FIG. 15.
Figure 22:
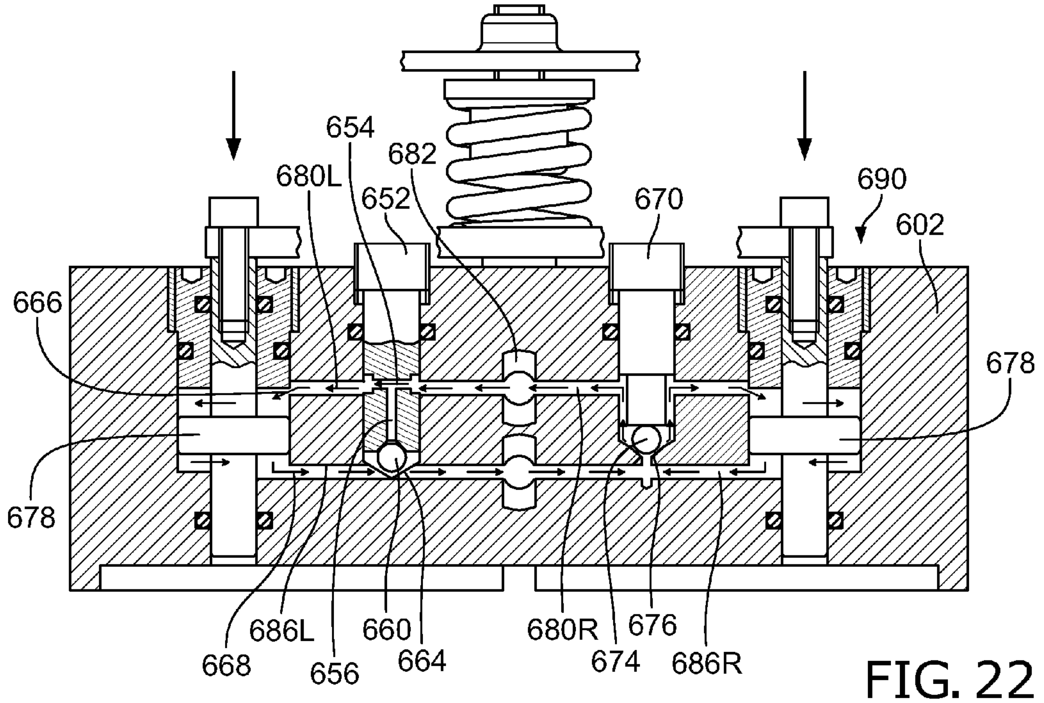
FIG. 22 is a schematic view of the dampener assembly of the stop valve shown in FIGS. 15-21, with the arrows indicating the direction of fluid flow as the stop valve is closing.

As shown in FIG. 21, an opening by-pass screw 652 is threaded into and sealed against the left cylinder 632, and has lateral through bore 654, and a vertical bore 656 extending from a ball seat 664 at the bottom end of the screw 652 into the lateral through bore 654. A ball 660 is positioned at the ball seat 664 forming a left side check valve. The bore or duct 686L intersects and connects into the ball seat 664 leading into the vertical bore 656. As shown in FIG. 22, the upper bore 680L connects the lateral bore 654 into the upper port in the left cylinder 632. The flange 678 on each dampener pin 630 is positioned in between the upper and lower ports 666 and 668 in the left and right cylinders.

Also as shown in FIG. 21, a closing by-pass screw 670 is threaded into and sealed against the right cylinder 634, and has a reduced diameter end 672. A ball 674 is provided on a ball seat 676 at the bottom of the right cylinder 634. The ball seat 676 leads into the lower right bore 686R. The ball 674 and ball seat 676 form a right side check valve.

The cylinders 632 and 634 and the bores 680L, 680R, 686L and 686R are filled with a viscous fluid, and together with the dampener pins 630, the pin plate 628 and the by-pass screws 652 and 670, form a dampening system 690 in the dampener body 602. Since the viscous fluid in the dampening system 690 is in a closed loop entirely isolated from the rest of the hydraulic system, the viscous fluid may be hydraulic fluid, or a different fluid as desired.

Figure 23:
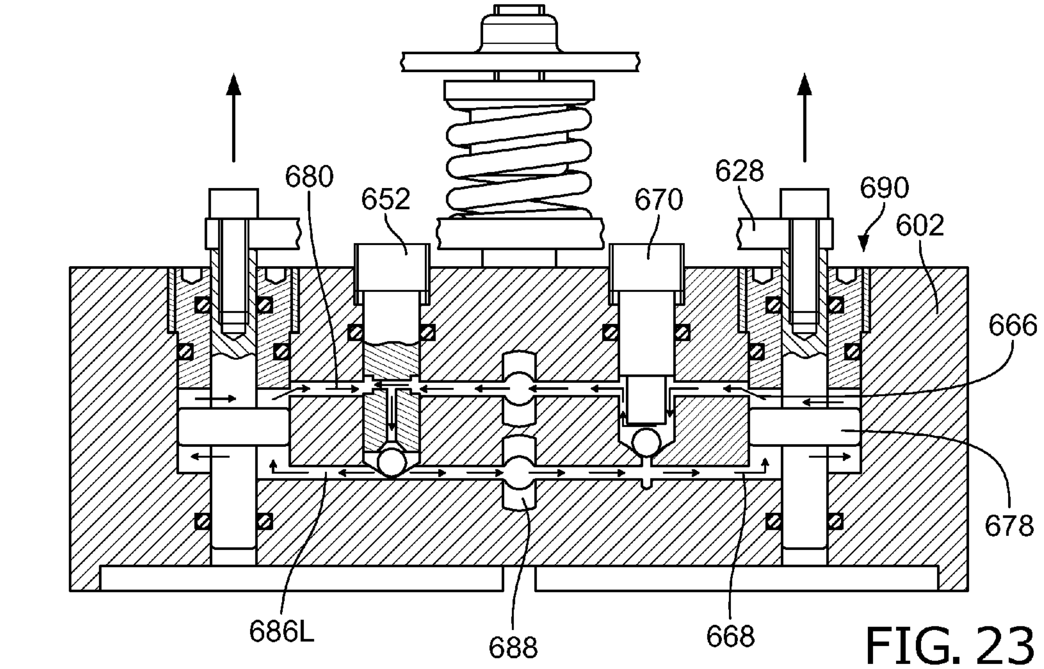
FIG. 23 is a schematic view of the dampener assembly of the stop valve shown in FIGS. 15-21, with the arrows indicating the direction of fluid flow as the stop valve is opening.
Figure 24:
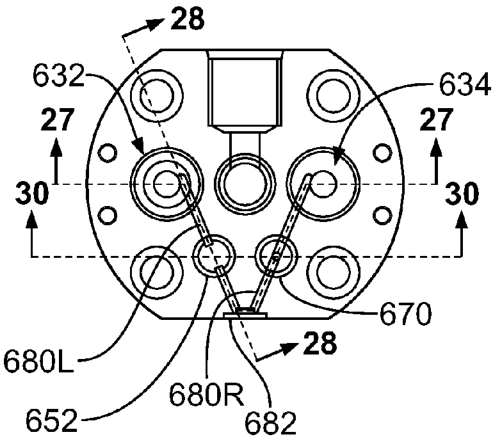
FIG. 24 is a top view of the dampener body shown in FIGS. 18-21.

Referring to FIGS. 18-23, in use, if the stop valve 600 is in the closed position shown in FIGS. 18 and 22, the stop valve 600 is opened by delivering electrical current to the solenoid 650, which pushes on the valve pin 638 up overcoming the opposing force of the spring 610, and moves the valve shoulder 640 away from the valve seat 642. This movement is damped by the dampening system 690. Specifically, as the valve pin 638 moves up, the pin plate 628 and the dampener pins 630 move with it. As shown in FIG. 23, fluid in the right cylinder 634 above the flange 678 of the right dampener pin 630 flows out of the right cylinder 634 through the upper right bore 680R, around the reduced diameter end 672 of the closing by-pass screw to the upper junction 682.

Since the fluid pressure is higher in the upper bore 680R compared to the lower bore 686R, the ball 674 is pushed down onto the seat 676 closing the right side check valve. The fluid continues to flow from the upper junction 682 into the upper left bore 680L and then down through the vertical bore 656 in the by-pass screw 652. The left side check valve is open due to the higher fluid pressure in the vertical bore 656 above the ball 660. Fluid flows through the left side check valve and then divides with a fraction of the fluid flowing through the lower left bore 686L into the left cylinder 632. The rest of the fluid flows in the opposite direction through the lower left bore 686L and the lower junction 688, into the lower right bore 686R and then into the right cylinder 634. Thus, as shown by the arrows in FIG. 23. the fluid flows in closed loops within the dampening system 690.

The viscous flow the fluid exerts viscous drag on the dampener pins, which in turn exerts viscous drag on the valve pin 638. Consequently, although the solenoid 646 may tend to act with a snap-action instantaneous movement, the dampening system smoothes out the movement of the valve pin 638. Jerking or jolting crane arm movements are therefore avoided.

Referring to FIG. 22, the stop valve 600 is in the open position. The stop valve 600 is closed by cutting off electrical current to the solenoid 646. Ordinarily, the valve pin 638 would then snap closed via the force of the spring 610. This near instantaneous closing of the valve jolts the hydraulic actuators to a sudden stop. The inertia of the telescoping arm sections can stretch the cables momentarily, which can cause the arm to resonate, or otherwise result in undesired camera movements, as well as noise. Various arm components may also be severely stressed, leading to premature wear.

As shown in FIG. 22. when power to the solenoid 646 is cut off, the spring urges the valve pin 638, the pin plate 628 and the dampener pins 630 downward, in a closing movement. However, the fluid in the cylinders 632 and 634 dampens this movement. As shown by the arrows in FIG. 22, fluid flows through the dampening system 690 in the reverse directions relative to FIG. 23. The ball 674 is pushed up off of the ball seat 678 by fluid pressure, allowing fluid flowing out of the lower port 668 to flow past the closing by-pass screw 670 and back into the cylinder 634 via the upper port 666. Ball 660 is pushed up into the ball seat 664 by fluid pressure, closing the left side check valve. Fluid flowing out of lower port in the left cylinder 632 moves through the lower bore, up through the open right side check valve, and then back into the left cylinder 632 via the upper port 666, as shown in FIG. 22. The balls 660 and 674 may move only e.g. 0.002-0.0010 inch between check valve open and closed positions.

The dampener pins 630 exert a viscous drag force on the valve pin 638, causing the valve pin 638 to close against the valve seat 642 with a smooth movement. The hydraulic actuators and the telescoping arm sections are accordingly brought to a smooth stop.

The amount of viscous dampening provided by the dampening system 690 may be changed by adjusting the positions of the by-pass screws 652 and 670. Although various control models may be used, in the designs shown in FIGS. 15-30, the stop valve 600 remains open only when electrical current is supplied to the solenoid 646. In the event of an electrical failure, the stop valve 600 accordingly closes, stopping movement of the arm. The stop valve 600 may also be closed via a stop switch on the controller 275 shown in FIG. 7. If the stop switch is used, the controller 275 may be designed to delay closing of the stop valve 600 sufficiently to allow the main control valve 230 to close first. The controller 275 may also prevent the stop valve 600 from opening unless the main control valve 230 is closed, to prevent inadvertent arm movement.

Thus, a novel stop valve for a camera crane has been shown and described. Various changes and modifications may of course be made without departing from the spirit and scope of the invention. The invention, therefore, should not be limited, except by the following claims and their equivalents.

The invention claimed is:

1. A camera support, comprising:
an arm;
a hydraulic system including:
  a hydraulic fluid reservoir,
  a source of hydraulic fluid under pressure;
  at least one hydraulic actuator connected directly or indirectly to the arm, for moving the arm;
  a control valve connected via hydraulic lines to the source and to the hydraulic actuator; and
a stop valve in the hydraulic system, with the stop valve including:
  a valve pin engagable onto a valve seat;
  a pin plate attached to the valve pin;
  a spring urging the valve pin in a first direction;
  first and second dampener pins in first and second cylinders, with the first and second dampener pins attached to the pin plate; and
  a closed loop fluid filled flow path connecting the first and second cylinders.

2. The camera support of claim 1 with the stop valve connected via hydraulic lines to the control valve and to the hydraulic fluid reservoir.

3. The camera support of claim 1 further comprising first upper and lower ports in each of the first cylinder, and second upper and lower ports in the second cylinder, and with the first dampener pin having a first flange positioned between the first upper and lower ports, and with the second dampener pin having a second flange positioned between the second upper and lower ports.

4. The camera support of claim 3 further comprising an upper channel connecting the first and second upper ports through a first check valve, and a lower channel connecting the first and second lower ports through a second check valve.

5. The camera support of claim 4 including a first screw extending into the upper channel for adjusting flow resistance through the upper channel.

6. The camera support of claim 4 including a second screw having a lateral bore and a vertical bore intersecting the lateral bore, with the lateral bore at least partially aligned with the upper channel, and with the vertical bore connecting into the lower bore through a second check valve.

7. The camera support of claim 1 with the stop valve comprising a dampener body attached to the valve seat body, and with the valve seat in the valve seat body and with the fluid filled flow path in the dampener body.

8. The camera support of claim 1 further comprising a solenoid having a piston positioned to move the valve pin.

9. A hydraulic stop valve comprising:
a valve pin engagable onto a valve seat;
a spring urging the valve pin in a first direction;
a solenoid having a piston positioned to move the valve pin in a second direction opposite from the first direction;
a plate attached to the valve pin;
first and second dampener pins in first and second cylinders, with the first and second dampener pins attached to the pin plate;
each cylinder having a first port and a second port, and each dampener pin having a flange between a first port and a second port;
a first flow path connecting the first ports of the first and second cylinders;
a second flow path connecting the second ports of the first and second cylinders;
a first check valve connecting the first and second flow paths and allowing flow only from the first flow path into the second flow path, and
a second check valve connecting the first and second flow paths and allowing flow only from the second flow path into the first flow path.

10. The stop valve of claim 9 with the spring urging the valve pin into engagement with the valve seat, and with the solenoid, when energized, holding valve pin away from the valve seat against the force of the spring.

11. The stop valve of claim 9 further comprising a dampener body attached to a valve seat body, with the valve seat in the valve seat body and with the cylinders, flow paths and check valves in the dampener body.

12. The stop valve of claim 11 with the first flow path divided into left and right segments, and with the left and right segments connecting at a first junction on an outer surface of the dampener body.

13. The stop valve of claim 12 with the left segment oriented at an acute angle to the right segment.

14. The stop valve of claim 11 further comprising a inlet port in the dampener body and an outlet in the valve seat body, and a valve pin tore around the valve pin, with the inlet and outlet ports connecting into the valve pin bore on opposite sides of the valve seat.

15. The stop valve of claim 9 further comprising a first by-pass screw associated with the first check valve and a second by-pass screw associated with the second check valve.

16. A camera support, comprising:

an arm;

a hydraulic system including:

at least one hydraulic actuator connected directly or indirectly to the arm, for moving the arm;

a control valve connected via a hydraulic line to the hydraulic actuator; and a stop valve in the hydraulic system connected via a hydraulic line to the control valve with the stop valve including:

a valve pin engagable onto a valve seat;

a pin plate attached to the valve pin;

spring urging the valve pin in a first direction;

first and second dampener pin in first an second cylinders, with the first and second dampener pins attached to the pin plate; and a closed loop fluid filled flow path connecting the first and second cylinders through first and second check valves.

17. The camera support of claim 16 further comprising an electrical system connected to the control valve and to the stop valve, and with the electrical system allowing the stop valve to open only when the control valve is closed.

* * * * *